United States Patent
Akiyama

(10) Patent No.: US 9,123,378 B2
(45) Date of Patent: Sep. 1, 2015

(54) LIBRARY APPARATUS AND CONTROL METHOD THEREOF

(75) Inventor: Yoshiki Akiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 788 days.

(21) Appl. No.: 13/358,017

(22) Filed: Jan. 25, 2012

(65) Prior Publication Data

US 2012/0237321 A1    Sep. 20, 2012

(30) Foreign Application Priority Data

Mar. 20, 2011  (JP) ................................ 2011-061831

(51) Int. Cl.
G11B 15/68 (2006.01)
G11B 17/22 (2006.01)

(52) U.S. Cl.
CPC ........ *G11B 15/6835* (2013.01); *G11B 15/6895* (2013.01); *G11B 17/225* (2013.01)

(58) Field of Classification Search
CPC ............. G11B 15/682; G11B 15/6835; G11B 15/689; G11B 15/6895; G11B 17/225
See application file for complete search history.

(56) References Cited

U.S. PATENT DOCUMENTS

| 5,287,414 A | 2/1994 | Foster |
| 5,442,500 A * | 8/1995 | Hidano et al. ............... 360/92.1 |
| 5,498,116 A * | 3/1996 | Woodruff et al. ............ 360/92.1 |
| 6,618,348 B1 * | 9/2003 | Coffin et al. ............. 369/178.01 |
| 6,813,113 B1 * | 11/2004 | Mueller et al. .............. 360/92.1 |
| 6,900,960 B2 * | 5/2005 | Gariepy et al. .............. 360/92.1 |
| 7,777,986 B2 * | 8/2010 | Barkley et al. ............... 360/92.1 |
| 7,800,860 B2 | 9/2010 | Steinhilber |
| 2002/0122271 A1 | 9/2002 | Coffin et al. |
| 2003/0030938 A1 | 2/2003 | Hashimoto et al. |
| 2005/0162775 A1* | 7/2005 | Ojima et al. ................. 360/92.1 |
| 2008/0043366 A1 | 2/2008 | Starr et al. |
| 2008/0239561 A1 | 10/2008 | Ikeuchi et al. |

FOREIGN PATENT DOCUMENTS

| EP | 1528553 A2 * | 5/2005 | ............ G11B 17/08 |
| JP | 8-53205 | 2/1996 | |
| JP | 2002-269875 | 9/2002 | |
| JP | 2003-59143 | 2/2003 | |
| JP | 2005-216389 | 8/2005 | |
| WO | 2010/004331 A1 | 1/2010 | |

* cited by examiner

*Primary Examiner* — James Keenan
(74) *Attorney, Agent, or Firm* — Staas & Halsey LLP

(57) ABSTRACT

A library apparatus includes a housing that has a magazine loading opening, the magazine storing a plurality of cartridges; a reader that reads an identifier provided on each cartridge stored in the magazine, the reader reading the identifiers while the magazine is being inserted through the magazine loading opening and pulled to a preset loading completion position; a transportation mechanism that is movable, the transportation mechanism including a removal mechanism that selectively removes one of the cartridges, and a connection member to be connected to the magazine inserted; and a controller that controls the transportation mechanism, wherein the transportation mechanism transports the removed cartridge to a cartridge processing unit, wherein the controller controls the transportation mechanism to stand by on the magazine loading opening side when the magazine is not loaded, and pull the magazine to the loading completion position when the controller detects that the magazine is inserted.

16 Claims, 18 Drawing Sheets

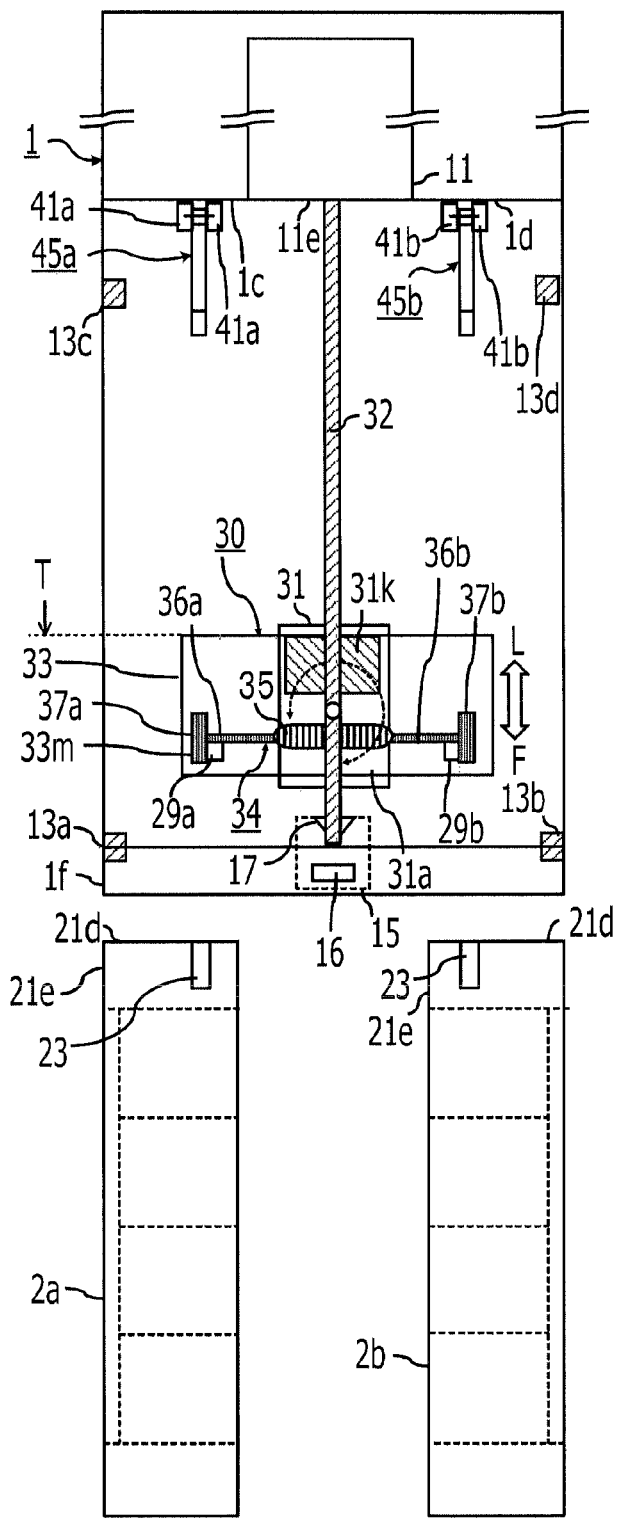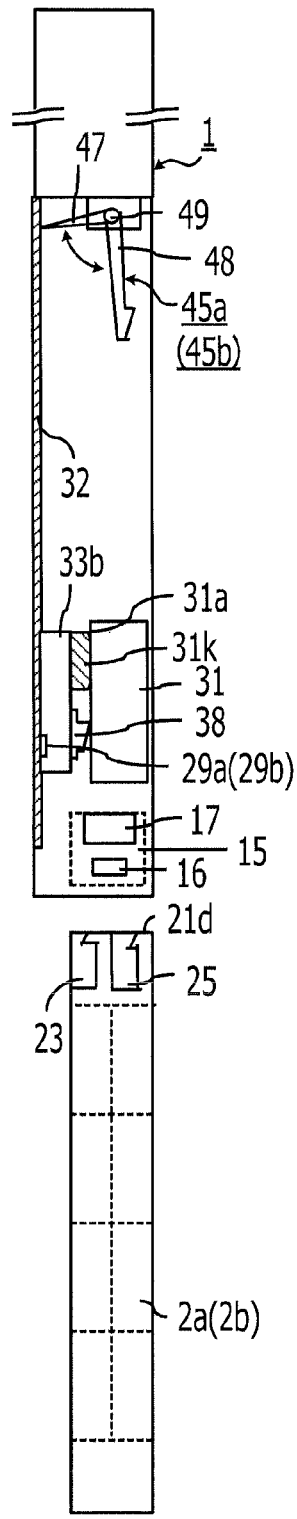

FIG. 13A
FIG. 13B
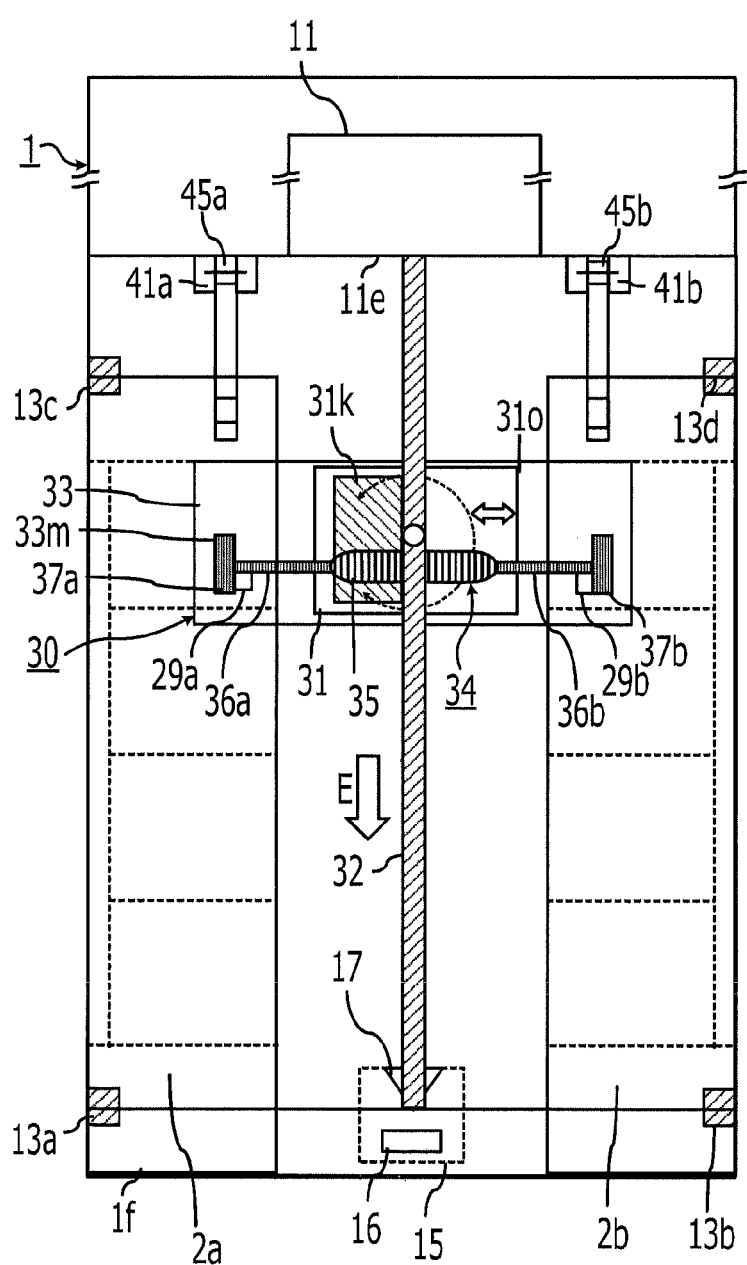
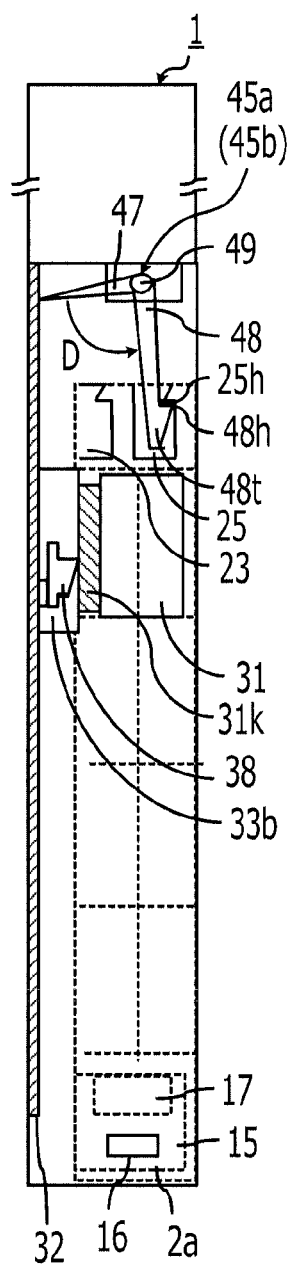

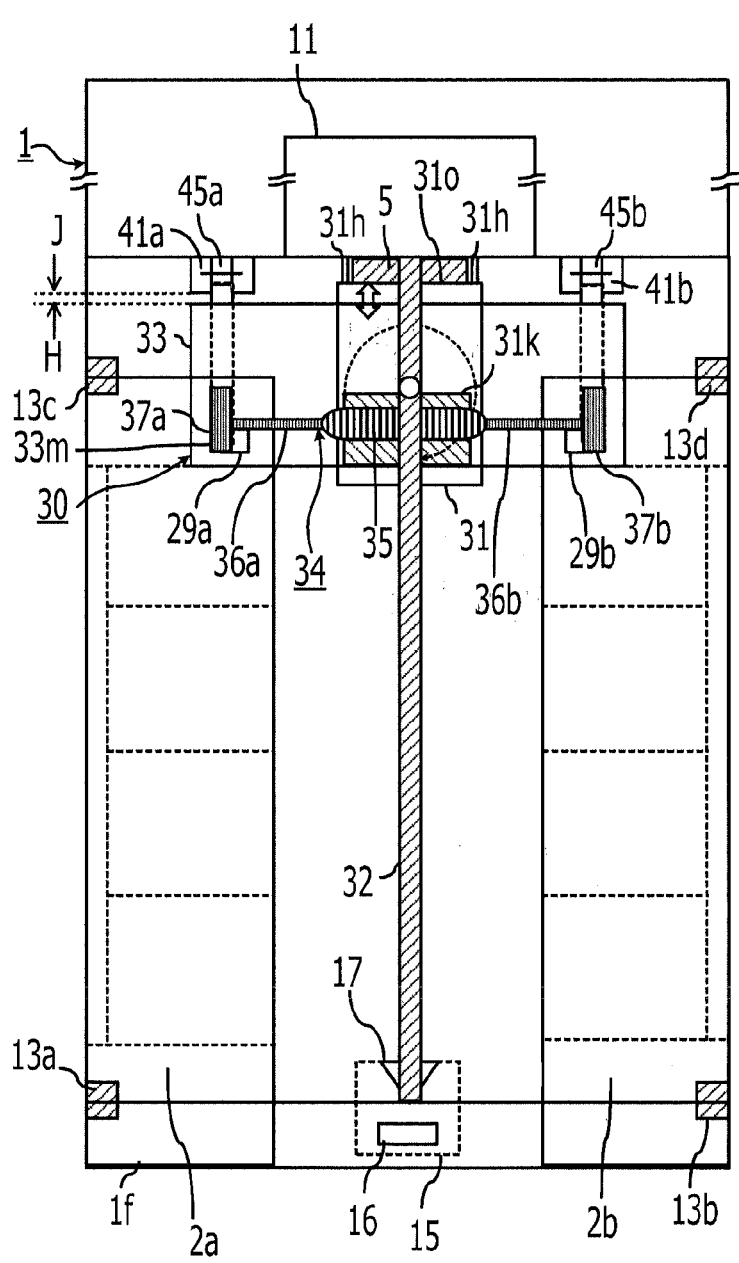
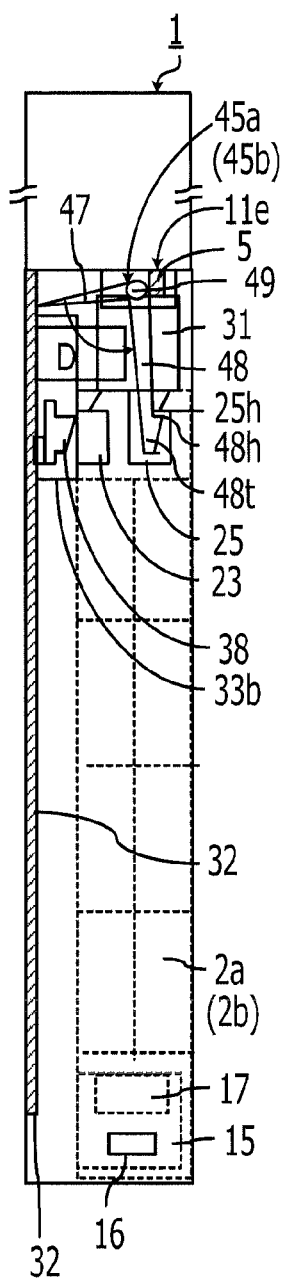
FIG. 14A
FIG. 14B

FIG. 18A
FIG. 18B
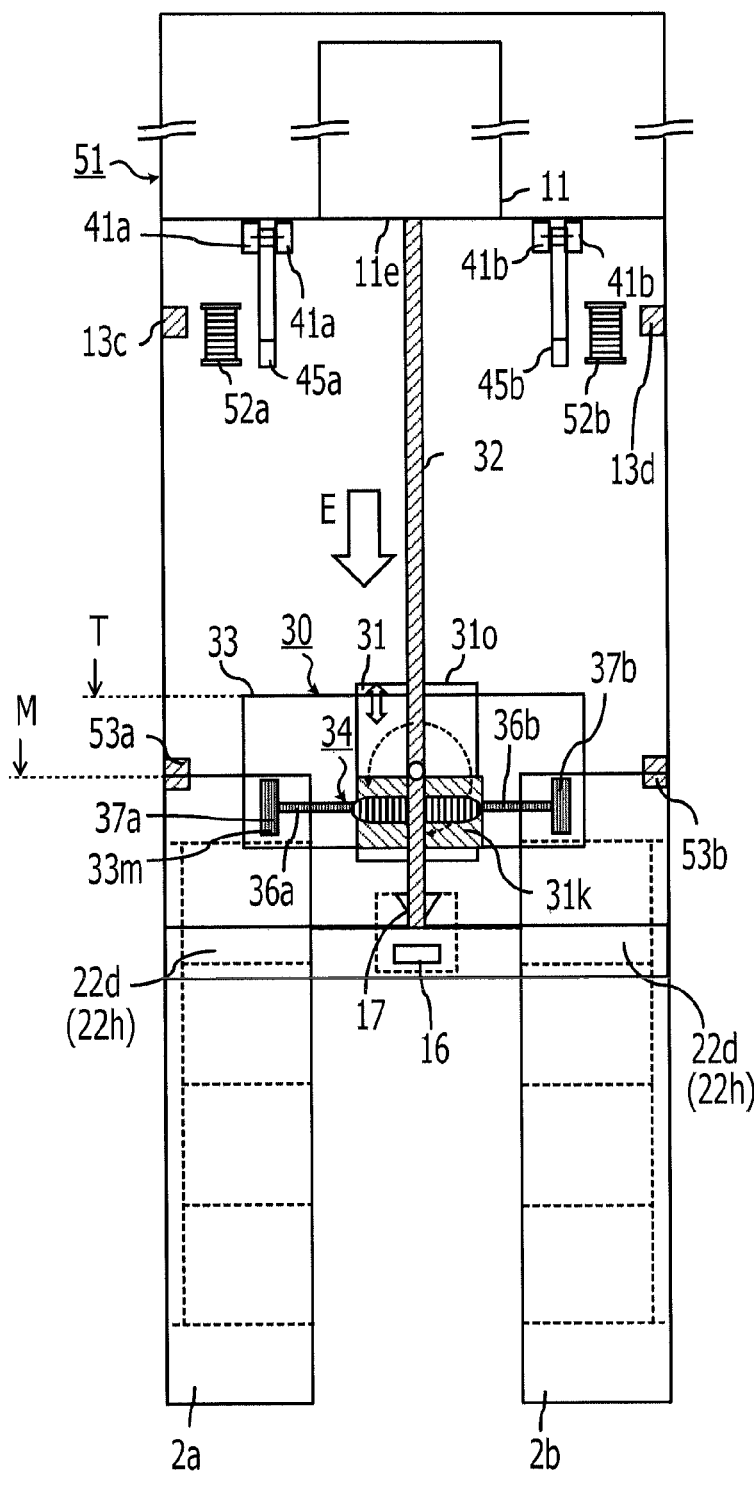
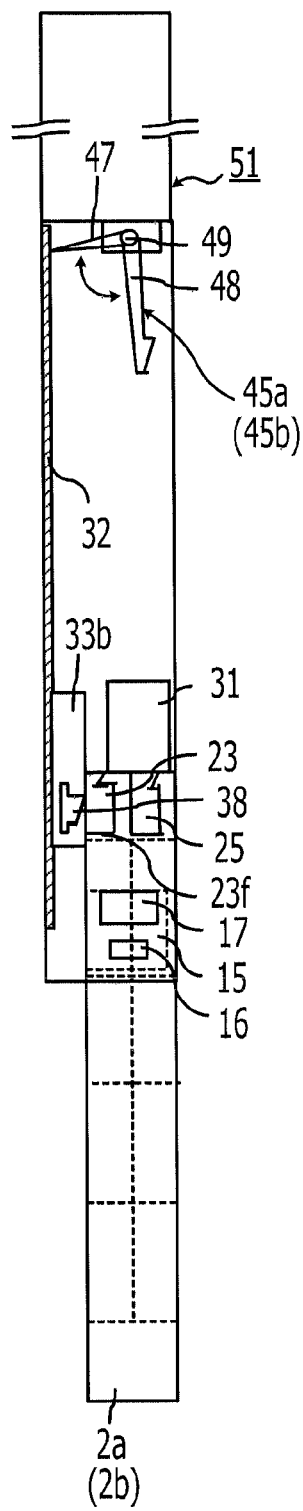

LIBRARY APPARATUS AND CONTROL METHOD THEREOF

CROSS-REFERENCE TO RELATED APPLICATION(S)

This application is based upon and claims the benefit of priority of the prior Japanese Patent Application No. 2011-61831, filed on Mar. 20, 2011, the entire contents of which are incorporated herein by reference.

FIELD

The embodiments discussed herein are related to a library apparatus.

BACKGROUND

As apparatuses that store a large amount of information, library apparatuses are known. Library apparatuses each store, for example, a plurality of cartridges in which recording media are stored, and allow information to be read from or written to the cartridges. Some library apparatuses are provided with removable magazines used to insert or remove a plurality of cartridges with a single operation. Such apparatuses are referred to as magazine-type library apparatuses.

The magazine has a plurality of slots arranged side by side in a direction parallel to the longitudinal direction of the library apparatus. Each slot stores one of the cartridges. In some cases, a plurality of rows of the arranged slots are stacked one on top of the other.

The library apparatus is equipped with a transportation mechanism therein that includes a hand mechanism to hold cartridges. The hand mechanism extends hands in a direction perpendicular to a direction in which slots are arranged to remove a target cartridge from a corresponding one of the slots. The removed cartridge is held by the hand mechanism and transported to a recording and playback device using the transportation mechanism. After the cartridge is used, the transportation mechanism returns the cartridge from the recording and playback device to the slot in which the cartridge existed before the cartridge was removed.

In order to exchange the cartridge stored in the magazine, the magazine that stores the target cartridge is removed from the library apparatus. An operator exchanges the cartridge of the removed magazine. Accordingly, every time the magazine is loaded in the library apparatus, the library apparatus usually recognizes what cartridge is stored in what slot corresponding to the exchange of the cartridge.

For this reason, each of the cartridges has a bar code label, which is an example of an identifier, on the rear surface thereof. On the bar code label, characters or an image that indicate a volume number, which identifies a particular cartridge, are printed as bar code information.

The volume number is expressed by, for example, a number that is a combination of a specified number of specified alpha-numeric characters and symbols. In order to read this bar code label using a bar code reader, a magnetic tape cartridge is stored in the slot by the operator such that the bar code label is directed to the opening side of the slot.

The bar code reader is mounted in the cartridge transportation mechanism. When the magazine has been loaded, the transportation mechanism moves to each slot to position the bar code reader. The bar code reader reads the bar code label of the cartridge at each slot.

A control portion of the library apparatus obtains bar code information of each bar code label. By doing this, the controller may recognize what volume number of cartridge is stored in what slot. An operation in which identifiers of cartridges are read to recognize the types and storing positions of the cartridges as described above is referred to as an inventory operation.

Japanese Laid-open Patent Publications No. 2003-59143 and No. 8-53205 are examples of disclosed related art.

SUMMARY

According to an aspect of the invention, a library apparatus includes a housing that has a magazine loading opening through which a magazine is inserted, the magazine storing a plurality of cartridges; a reader that reads an identifier provided on each cartridge stored in the magazine, the reader reading the identifiers while the magazine is being inserted through the magazine loading opening and pulled to a preset loading completion position; a transportation mechanism that is movable in a direction in which the cartridges are inserted and in a direction in which the cartridges are removed, the transportation mechanism including a removal mechanism that selectively removes one of the cartridges stored in the magazine having been loaded, and a connection member to be connected to the magazine inserted through the magazine loading opening; and a controller that controls the transportation mechanism, wherein the transportation mechanism transports the removed cartridge to a cartridge processing unit provided in the library apparatus, the removed cartridge having been removed using the removal mechanism, wherein the controller controls the transportation mechanism such that the transportation mechanism stands by on the magazine loading opening side when the magazine is not loaded, and controls the transportation mechanism such that the transportation mechanism pulls the magazine to the loading completion position when the controller detects that the magazine is inserted through the magazine loading opening and the connection member is connected to the magazine.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 4A and 4B are respectively a plan view and a side view illustrating the example of the internal structure of the library apparatus;

FIGS. 13A and 13B are first diagrams of an example of states of the connection member and the magazine locks during an operation;

FIGS. 14A and 14B are second diagrams of the example of the states of the connection member and the magazine locks during the operation;

FIGS. 18A and 18B are third diagrams of the example of the magazine ejecting operation.

DESCRIPTION OF EMBODIMENTS

Embodiments will be described in detail below with reference to the drawings. In each embodiment, a magnetic tape library apparatus is described as an example of a library apparatus. The magnetic tape library apparatus includes magazines and a magnetic tape drive. Each magazine stores one or a plurality of magnetic tape cartridges. The magnetic tape drive is an example of a cartridge processing unit.

Figure 1:
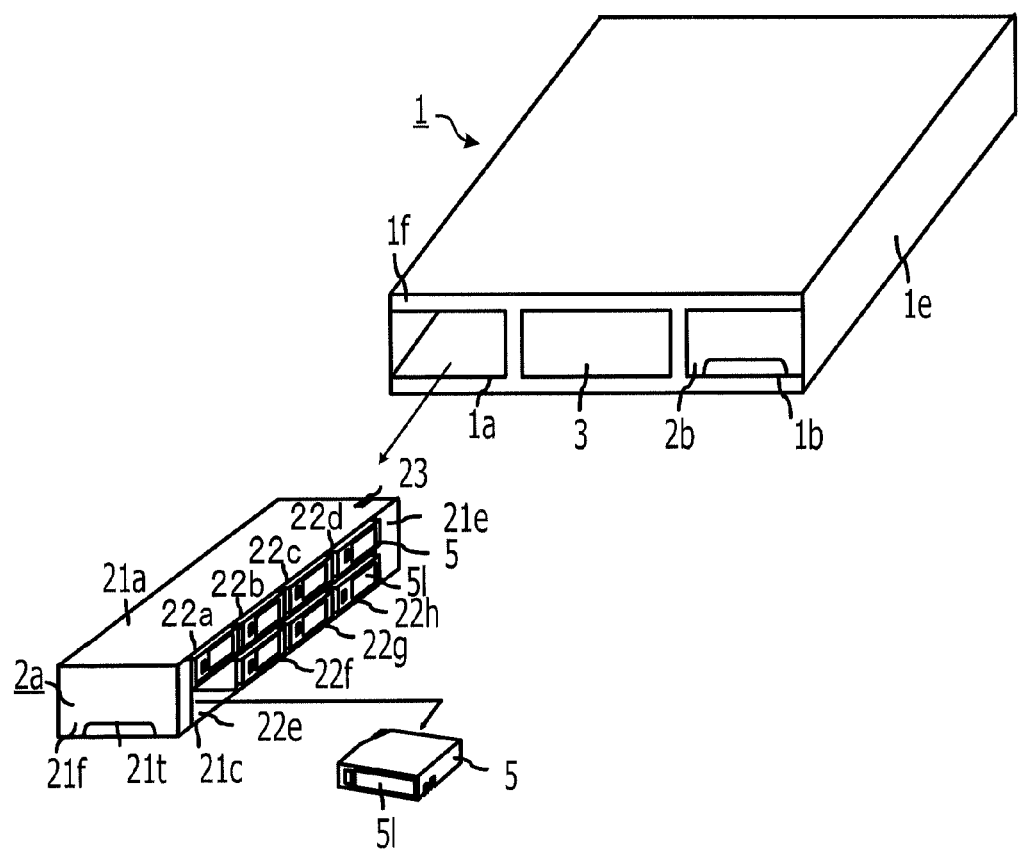
FIG. 1 is an external view of a library apparatus.

FIGS. 1 to 15B illustrate an example of a magnetic tape library apparatus 1 according to a first embodiment. FIG. 1 is an external view of the library apparatus. Referring to FIG. 1, the magnetic tape library apparatus 1 includes a front panel 1f on a front surface of a housing 1e. The front panel 1f has two magazine loading openings 1a and 1b on the left and right sides thereof, and an operator panel (OP panel) 3 at a central portion thereof.

The operator panel 3 includes operation buttons to be operated by an operator, a display unit, and so forth. Magazines 2a and 2b are inserted into and removed from the housing 1e through the magazine loading openings 1a and 1b. The magazines 2a and 2b are inserted by the operator through the magazine loading openings 1a and 1b, and, as described later, pulled by the library apparatus 1 to corresponding preset loading completion positions.

FIG. 1 illustrates a state in which the magazine 2a is pulled out from the housing 1e, and a magnetic tape cartridge 5 is removed from the magazine 2a. A handle 21t is provided in a front wall surface 21f disposed on a front side of the magazine 2a. The handle 21t allows the operator to manually pull out the magazine 2a from the housing 1e.

The magazine 2a has an upper wall surface 21a, a lower wall surface 21c, and a plurality of slots. The slots are arranged side by side in a space between the upper and lower wall surfaces 21a and 21c in a direction parallel to insertion and ejection directions of the magazine 2a (a longitudinal direction of the library apparatus 1). For example, the magazine 2a has upper slots 22a to 22d and lower slots 22e to 22h, which house a total of eight tape cartridges 5.

The magazine 2a has a rear portion wall 21e formed on a side thereof opposite the front wall surface 21f. The rear portion wall 21e of the magazine 2a is a wall part having a leading wall surface that initially enters the housing 1e when the magazine 2a is inserted into the housing 1e through the magazine loading opening 1a. A connection hole 23 is formed on an upper surface of the rear portion wall 21e of the magazine 2a. The connection hole 23 is an example of a first engaging portion to be engaged with a connection member, which will be described later. Although there are differences such as the direction of openings of the slots 22a to 22h between the magazines 2a and 2b, the magazine 2b has a structure that is generally similar to that of the magazine 2a, and the description of the magazine 2b is omitted.

Each of the magnetic tape cartridges 5 includes a bar code label 5l on a rear surface thereof. The bar code label 5l is an example of an identifier. Characters or an image that indicate a volume number, which identifies a particular cartridge, is printed on the bar code label 5l. Each of the magnetic tape cartridges 5 is stored in one of the slots 22a to 22h with the bar code label 5l thereof positioned at the opening side.

Figure 2:
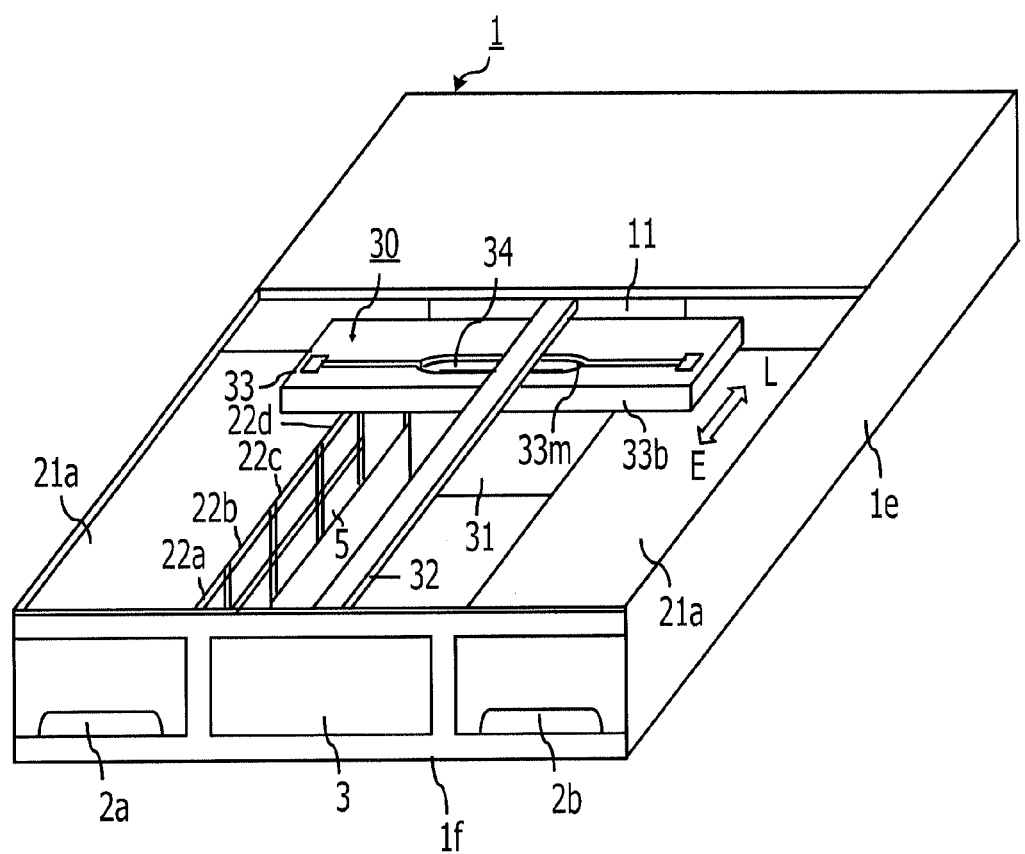
FIG. 2 is a first perspective view of an example of an internal structure of the library apparatus.

FIG. 2 is a first perspective view illustrating an example of an internal structure of the library apparatus 1. FIG. 2 is a conceptual view in which part of an upper surface of the housing 1e is removed to facilitate understanding of the interior of the library apparatus 1. The housing 1e has a housing space therein. The two magazines 2a and 2b are respectively housed on the left and right side of a front housing portion. A magnetic tape drive 11, a power source 14 (not illustrated), a controller 12 (not illustrated), and so forth are disposed in a rear housing portion of the housing 1e.

A transportation mechanism 30 is provided in a central portion of the front housing portion of the housing 1e. The transportation mechanism 30 transports the magnetic tape cartridges 5 to the magnetic tape drive 11 provided in the library apparatus 1. A hand mechanism 31 is an example of a removal mechanism that selectively removes one of the magnetic tape cartridges 5 housed in the magazines 2a and 2b having been loaded.

A robot mechanism 33 is an example of a movement mechanism that linearly moves in the insertion and ejection directions of the magazines 2a and 2b. The transportation mechanism 30 includes the hand mechanism 31 and the robot mechanism 33. The hand mechanism 31 has a pair of left and right hands in an inner portion (not illustrated) thereof. The hands insert and remove one of the magnetic tape cartridges 5 into and from one of the slots 22a to 22h, and into and from the magnetic tape drive 11.

A table is provided to hold one of the magnetic tape cartridges 5 removed from one of the slots 22a to 22h or the magnetic tape drive 11. In order to insert or remove one of the magnetic tape cartridges 5 into or from one of the slots 22a to 22h, the pair of hands are driven by a hand motor 31p so as to move in a direction perpendicular to a direction in which the slots 22a to 22h are arranged.

In order to insert or remove one of the magnetic tape cartridges 5 into or from the magnetic tape drive 11, the pair of hands are driven by the hand motor 31p so as to move in a direction parallel to a direction in which the slots 22a to 22h are arranged (the longitudinal direction of the library apparatus 1).

The robot mechanism 33 is disposed above upper wall surfaces 21a of the magazines 2a and 2b. The robot mechanism 33 includes a base 33b, a hand mechanism rotating motor 33q, and a robot motor 33p. The hand mechanism 31 is rotatably held by the base 33b. The hand mechanism rotating motor 33q rotates the hand mechanism 31. The robot motor 33p drives the robot mechanism 33.

The robot mechanism 33 is, suspended from a rail 32 and linearly moved by the robot motor 33p in the longitudinal direction (a depth direction) of the library apparatus 1 along the rail 32, that is, in a direction parallel to the insertion direction (L-direction) of the magazines 2a and 2b and the ejection direction (E-direction) of the magazines 2a and 2b.

By using the above-described robot mechanism 33 together with the hand mechanism 31, one of the magnetic tape cartridges 5 may be removed from a target slot out of the slots 22a to 22h of the magazines 2a and 2b to be transported to the magnetic tape drive 11. The magnetic tape cartridge 5 may also be returned from the magnetic tape drive 11 to one of the slots, in which the magnetic tape cartridge 5 was stored before it was removed, out of the slots 22a to 22h of the magazines 2a and 2b.

The base 33b of the robot mechanism 33 has a connection member retracting hole 33m into which a connection member 34 is retracted. The connection member retracting hole 33m is formed in a portion close to the front panel 1f in the base 33b. The details of the connection member 34 will be described later.

Figure 3:
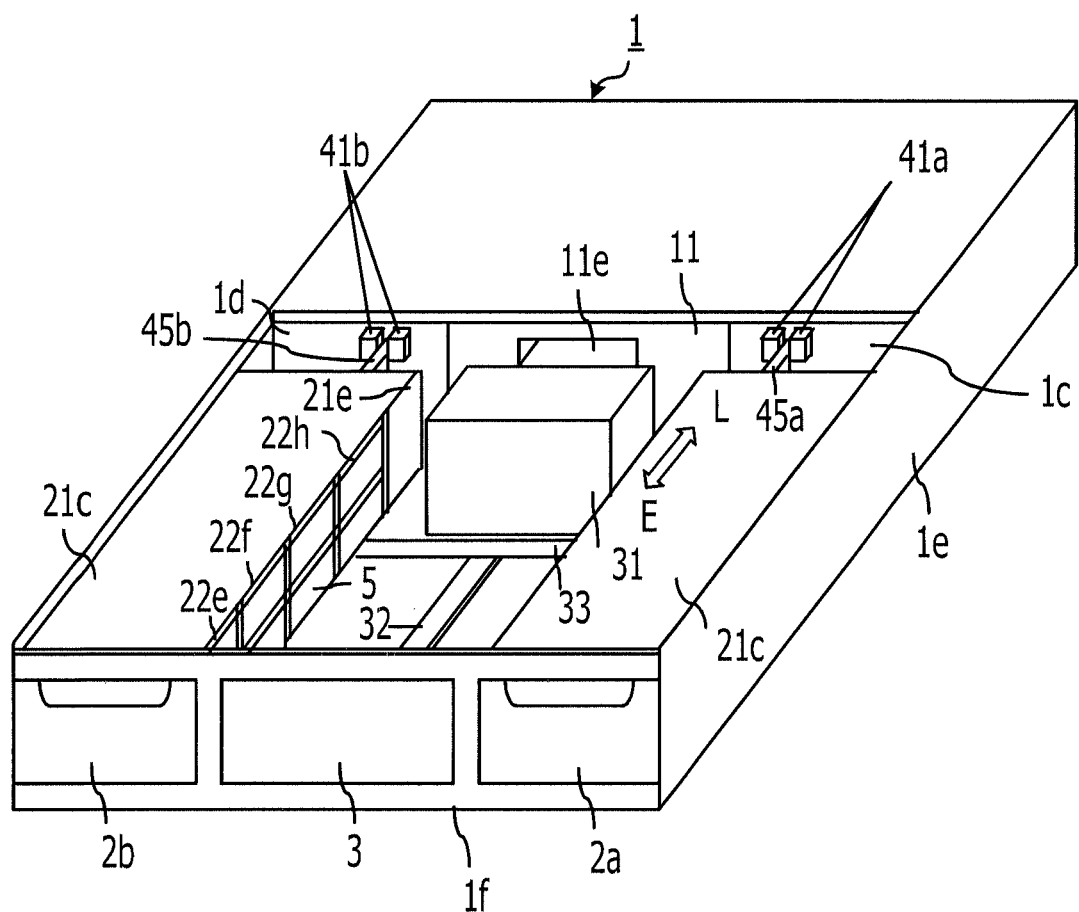
FIG. 3 is a second perspective view of the example of the internal structure of the library apparatus.

FIG. 3 is a second perspective view illustrating the example of the internal structure of the library apparatus 1. FIG. 3 is a conceptual view in which part of a lower surface of the housing 1e is removed to facilitate understanding of the interior of the library apparatus 1. FIG. 3 illustrates a state in which the hand mechanism 31 is held by the robot mechanism 33.

The direction of the hand mechanism 31 may be changed by rotation caused by the hand mechanism rotating motor 33q (not illustrated). This allows a transportation opening 31o for the magnetic tape cartridge 5 of the hand mechanism 31 to oppose the left magazine 2a, the right magazine 2b, or an insertion and ejection opening 11e of the magnetic tape drive 11.

Also in the housing 1e, magazine locks 45a and 45b are respectively provided on left and right rear wall surfaces 1c and 1d. With the magazine locks 45a and 45b, a situation in which the magazines 2a and 2b are pulled out is avoided. The magazine locks 45a and 45b are pivotably held by holding portions 41a and 41b.

FIGS. 4A and 4B are respectively a plan view and a side view illustrating the example of the internal structure of the library apparatus 1. FIG. 4A is a conceptual view of the housing 1e seen from above, and FIG. 4B is a conceptual view of the housing 1e seen from a side. In FIGS. 4A and 4B, the internal structure of the library apparatus 1 is illustrated with the magazines 2a and 2b pulled out of the housing 1e. The connection hole 23 is formed on the upper surface of the rear portion wall 21e of each of the magazines 2a and 2b. Each of the connection holes 23 is an example of a first engaging portion to be engaged with the connection member 34.

A rear surface 21d of each of the magazines 2a and 2b is a leading wall surface that initially enters the housing 1e when the magazines 2a and 2b are inserted into the housing 1e through the magazine loading openings 1a and 1b. Each rear surface 21d has a lock hole 25, which is an example of a first locking portion to be engaged with the magazine lock 45a or 45b.

A reader unit 15, which is an example of a reader to read an identifier (the bar code label 5l), is provided at a position opposite the slots out of the slots 22a to 22h of the magazines 2a and 2b that is undergoing a loading operation. The reader unit 15 includes an area charge coupled device (area CCD) 16, which is an example of a detector, and a mirror portion 17.

The mirror portion 17 uses two reflector plates, which form an angle with each other. The mirror portion 17 is provided near the front panel 1f in the housing 1e. The two reflector plates are respectively directed to the magazine loading openings 1a and 1b to sequentially reflect the slots 22a to 22h of the magazines 2a and 2b entering through the magazine loading openings 1a and 1b. The mirror portion 17 reflects the images of the slots 22a to 22h toward the area CCD 16.

Accordingly, the area CCD 16 may be disposed in an empty space of the housing 1e near the front panel 1f, and may read the bar code labels 5l of the magnetic tape cartridges 5 stored in the slots 22a to 22h. The mirror portion 17 uses two reflector plates corresponding to the two magazines 2a and 2b in this example. Alternatively, a total of four reflector plates may be provided corresponding to two rows of the slots 22a to 22h of each of the two magazines 2a and 2b. Likewise, a plurality of area CCDs 16 may be provided.

The single area CCD 16 is made to capture an image of the slots out of the slots 22a to 22h of the two magazines 2a and 2b. That is, with a single capturing operation, the area CCD 16 may obtain an image of a total of four slots out of the slots 22a to 22h, which are one of the upper slots 22a to 22d and one of the lower slots 22e to 22h of the magazine 2a and one of the upper slots 22a to 22d and one of the lower slots 22e to 22h of the magazine 2b.

Accordingly, the reader unit 15 may read the bar code labels 5l at high speed. Alternatively, a plurality of area CCDs 16 may be provided to perform simultaneous reading without using the mirror portion 17 as long as there is no problem with the cost or space to allocate the area CCDs 16.

First detection sensors 13a and 13b are provided near the front panel 1f on the left and right side of the housing 1e. When the magazines 2a and 2b inserted through the magazine loading openings 1a and 1b respectively pass the first detection sensors 13a and 13b, the first detection sensors 13a and 13b detect insertion of the magazines 2a and 2b through the magazine loading openings 1a and 1b. Accordingly, the library apparatus 1 may recognize the start of loading of the magazines 2a and 2b into the housing 1e using the first detection sensors 13a and 13b.

In addition, second detection sensors 13c and 13d are provided in a rear part of the front housing portion on the left and right side of the housing 1e. When the magazines 2a and 2b inserted through the magazine loading openings 1a and 1b respectively pass the second detection sensors 13c and 13d, the second detection sensors 13c and 13d detect that the magazines 2a and 2b are pulled to corresponding magazine loading completion positions N in the housing 1e. Accordingly, the library apparatus 1 may recognize the completion of loading of the magazines 2a and 2b into the housing 1e using the second detection sensors 13c and 13d.

When the magazines 2a and 2b inserted into the housing 1e pass the first detection sensors 13a and 13b and the second detection sensors 13c and 13d, the first detection sensors 13a and 13b and the second detection sensors 13c and 13d detect that the magazines 2a and 2b are ejected through the magazine loading openings 1a and 1b.

Accordingly, ejection of the magazines 2a and 2b may be detected by the detection results of the first detection sensors 13a and 13b and the second detection sensors 13c and 13d. The first detection sensors 13a and 13b and the second detection sensors 13c and 13d may use optical sensors, magnetic sensors, push switches, or the like.

The connection member 34 disposed in the connection member retracting hole 33m has a central block portion 35 and connection arms 36a and 36b provided on one and the other sides of the central block portion 35. The connection arms 36a and 36b, each of which has a T shape, respectively extend from the central block portion 35 toward the left and right sides of the housing 1e.

The connection arms 36a and 36b respectively have end portions 37a and 37b. From each of the end portions 37a and 37b, a connection protrusion 38, which is an example of a second engaging portion, extends toward the lower surface of the housing 1e. The connection member 34, which is desirably formed of a material having high durability, may be formed of metal, plastic, resin, or the like.

FIGS. 4A and 4B also illustrate a state in which the robot mechanism 33 stands by at a standby position T that is preset on the front side of the housing 1e, that is, on the magazine loading openings 1a and 1b side (near the front panel 1f). A step portion 31k is formed on an upper surface 31a of the hand mechanism 31. The step portion 31k rises from the upper surface 31a by a specified height. The step portion 31k is an example of a connection release member that releases connection of the connection member 34 to the magazines 2a and 2b. The details of the connection release member will be described later.

Third detection sensors 29a and the 29b are respectively provided on the left and right sides of the connection member retracting hole 33m. The third detection sensors 29a and 29b respectively detect whether or not the end portions 37a and 37b of the connection member 34 exist at upper positions. The third detection sensors 29a and 29b may use optical sensors, magnetic sensors, push switches, or the like.

When the end portions 37a and 37b are at the upper positions, and the first detection sensors 13a and 13b detect that the magazines 2a and 2b are loaded, the library apparatus 1 is in a connection released state in which the connection of the connection member 34 to the magazines 2a and 2b is released.

When the end portions 37a and 37b are at the lower positions, and the first detection sensors 13a and 13b do not detect loading of the magazines 2a and 2b, the library apparatus 1 is in a loading standby state in which the library apparatus 1 waits for loading of the magazines 2a and 2b. When the end portions 37a and 37b are at the lower positions, and the first detection sensors 13a and 13b detect loading of the magazines 2a and 2b, the library apparatus 1 is in a connected state in which the connection member 34 is connected to the magazines 2a and 2b.

The magazine locks 45a and 45b provided on the left and right rear wall surfaces 1c and 1d in the housing 1e are respectively supported by the holding portions 41a and 41b. The holding portions 41a and 41b respectively support the magazine locks 45a and 45b from both sides of the magazine locks 45a and 45b. As illustrated in FIG. 4B, the magazine locks 45a and 45b are similar in structure and each include a pivotal shaft 49, a first lock arm 47, and a second lock arm 48.

The first lock arm 47 and the second lock arm 48, which are desirably formed of a material having high durability, may be formed of metal, plastic, resin, or the like. The first lock arm 47 forms an angle of, for example, 90° with the second lock arm 48. When the first lock arm 47 is pivoted, the second lock arm 48 is also pivoted in an interlocked manner.

Figure 5:
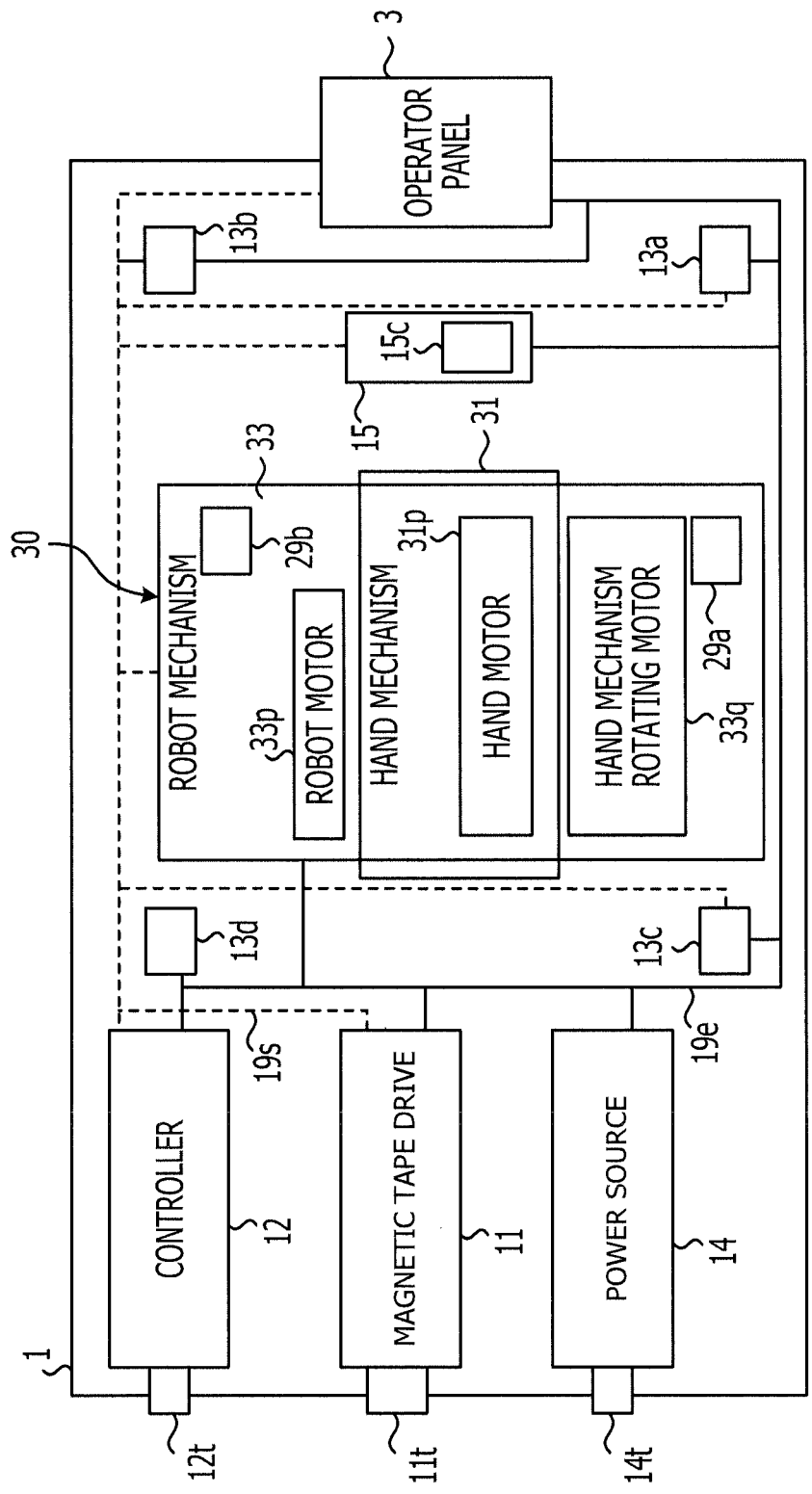
FIG. 5 is a control block diagram of the library apparatus.

FIG. 5 is a control block diagram of the library apparatus 1. As illustrated in FIG. 5, the controller 12, which controls the entirety of the library apparatus 1, is connected to the operator panel 3, the magnetic tape drive 11, the transportation mechanism 30, the reader unit 15, and so forth through a signal bus 19s. The power source 14 supplies power to the controller 12, the operator panel 3, the magnetic tape drive 11, the transportation mechanism 30, the reader unit 15, and so forth through a power source bus 19e.

The robot motor 33p and the hand mechanism rotating motor 33q of the robot mechanism 33 are driven in accordance with instructions from the controller 12. Likewise, the hand motor 31p of the hand mechanism 31 is driven in accordance with instructions from the controller 12. The controller includes, for example, a processor such as a central processing unit (CPU).

The reader unit 15 includes a processing circuit 15c. The processing circuit 15c processes images taken by the area CCD 16 to obtain bar code information. The bar code information obtained is transmitted to the controller 12 through the signal bus 19s. The controller 12 creates a cartridge storing management table using the received bar code information. The cartridge storing management table is used to manage the types and storing positions of the magnetic tape cartridges 5.

The controller 12 stores the cartridge storing management table in a memory (not illustrated). Accordingly, the controller 12 may refer to the cartridge storing management table to recognize in what slot of what magazine a target magnetic tape cartridge 5 is stored, and issue an instruction to the transportation mechanism 30.

Detection signals of the first detection sensors 13a and 13b, the second detection sensors 13c and 13d, and the third detection sensors 29a and 29b are also transmitted to the controller 12 through the signal bus 19s. Input and output terminals 11t of the magnetic tape drive 11, input and output terminals 12t of the controller 12, and input and output terminals 14t of the power source 14 are disposed in a rear surface of the housing 1e.

The input and output terminals 11t of the magnetic tape drive 11 are connected to a host computer (not illustrated) through an interface. The input and output terminals 12t of the controller 12 are similarly connected to the host computer through the interface. The input and output terminals 14t of the power source 14 are connected to an alternating-current power source.

Figure 6A:
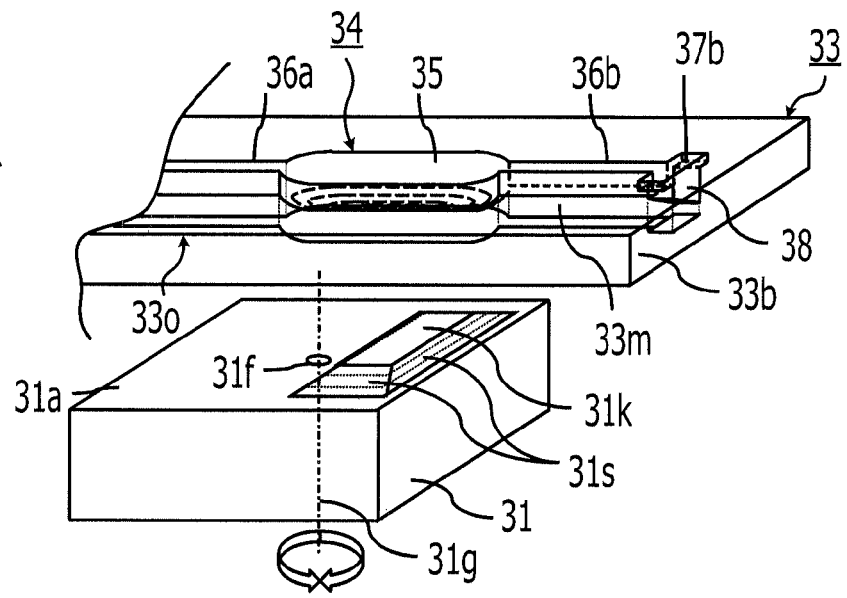
FIGS. 6A to 6C illustrate examples of the structure of a connection member and the positional relationship between the connection member and a hand mechanism.
Figure 6B:
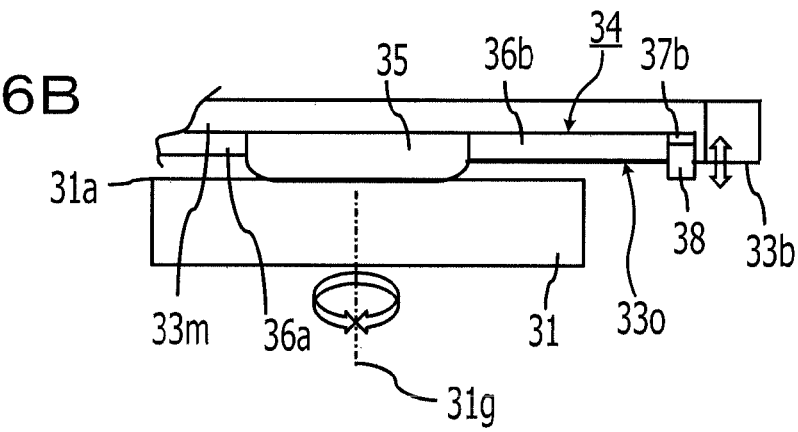
Figure 6C:
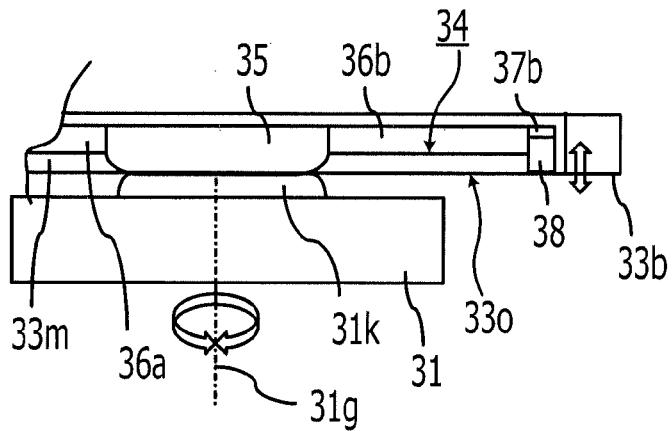

FIGS. 6A to 6C illustrate examples of the structure of the connection member 34 and the positional relationship between the connection member 34 and the hand mechanism 31. FIG. 6A is an exploded perspective view illustrating the positional relationship between the connection member 34 and the hand mechanism 31. As illustrated in FIG. 6A, the shape of the connection member retracting hole 33m is substantially similar to the shape of the connection member 34. The connection member retracting hole 33m is formed in the base 33b of the robot mechanism 33. The connection member retracting hole 33m has a size sufficient to allow the connection member 34 to move vertically.

The connection member retracting hole 33m has an opening 33o on a lower side of the base 33b. The connection member 34 moves into and out of the connection member retracting hole 33m through the opening 33o. That is, the connection member 34 is not secured to the base 33b. The connection member 34 is disposed in the connection member retracting hole 33m such that the connection member 34 may fall off owing to its own weight. Unlike the connection member 34, the base 33b does not move vertically therein.

The step portion 31k is formed on the upper surface 31a of the hand mechanism 31. The step portion 31k rises from the surface by a specified height. The step portion 31k supports the connection member 34 from below when the step portion 31k opposes the central block portion 35 of the connection member 34.

The hand mechanism 31 has a central hole 31f, to which the shaft (not illustrated) of the hand mechanism rotating motor 33q is connected. The hand mechanism 31 is rotatable by 360° about a rotation shaft 31g. Accordingly, the step portion 31k is movable to four positions, that is, to the front, rear, left, and right positions through every 90° rotation.

The connection member 34 is slid between the step portion 31k and the upper surface 31a as the hand mechanism 31 rotates. In order to facilitate movement of the connection member 34 onto the step portion 31k, inclined surfaces 31s are formed on four side surfaces of the step portion 31k.

FIG. 6B is a sectional view illustrating a state in which the connection member 34 contacts the upper surface 31a. As illustrated in FIG. 6B, when the upper surface 31a is positioned immediately below the central block portion 35, the connection member 34 contacts the upper surface 31a and is supported by the upper surface 31a from below. At this time, the connection protrusion 38 of the end portion 37b protrudes from the opening 33o. Likewise, the connection protrusion 38 on the connection arm 36a side (not illustrated) protrudes from the opening 33o.

Accordingly, the connection protrusions 38 of the end portions 37a and 37b protrude and enter the connection holes 23 of the magazines 2a and 2b, respectively, thereby connecting the magazines 2a and 2b to the connection member 34. Although an example of engagement of the connection protrusions 38 with the connection holes 23 is described, each of the magazines 2a and 2b may include a hooking member instead of the connection hole 23 to be connected to the transportation mechanism 30. Alternatively, each of the connection protrusions 38 may have a connection hole, to which the hooking member of the magazines 2a or 2b is hooked, thereby connecting the magazines 2a and 2b to the transportation mechanism 30.

FIG. 6C is a sectional view illustrating a state in which the connection member 34 contacts the step portion 31k. As illustrated in FIG. 6C, when the step portion 31k is positioned immediately below the central block portion 35, the connection member 34 contacts the step portion 31k and is supported by the step portion 31k from below. At this time, the connection protrusion 38 of the end portion 37b does not protrude from the opening 33o.

It is sufficient that the specified height of the step portion 31k is set to a height that allows the connection protrusions 38 to be retracted in the connection member retracting hole 33m. In the present embodiment, the specified height of the step portion 31k is preset to a height that is equal to or greater than a distance by which each connection protrusion 38 protrudes from the opening 33o.

Likewise, the connection protrusion 38 on the connection arm 36a side (not illustrated) does not protrude from the opening 33o. Accordingly, the connection protrusions 38 of the end portions 37a and 37b move away from the connection holes 23 of the magazines 2a and 2b, respectively. Thus, connection of the magazines 2a and 2b to the connection member 34 is released.

Figure 7A:
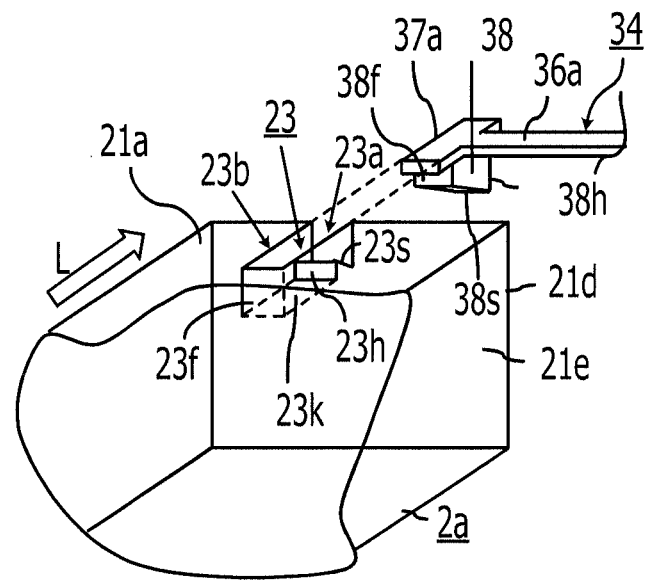
FIGS. 7A to 7C illustrate an example of the relationship between a connection protrusion of the connection member and a connection hole.
Figure 7B:
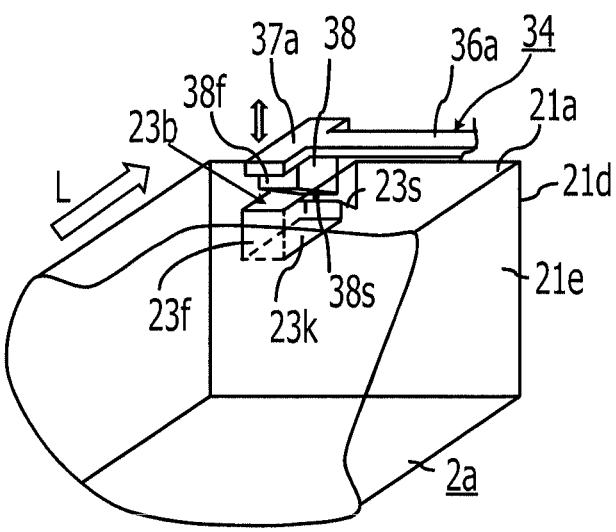
Figure 7C:
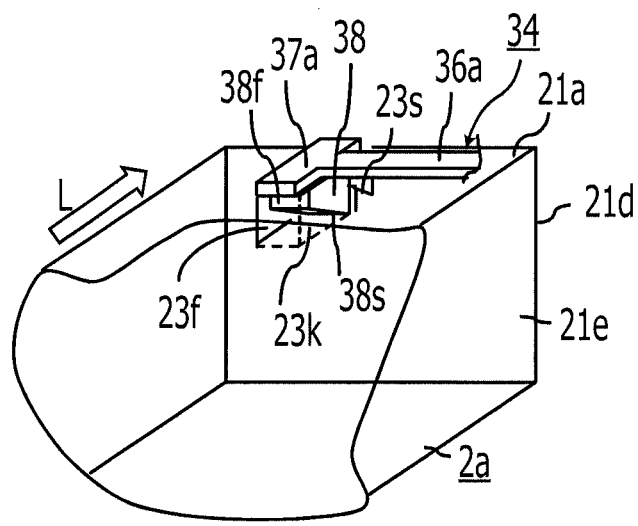

FIGS. 7A to 7C illustrate an example of the relationship between the connection protrusion 38 of the connection member 34 and the connection hole 23. In FIG. 7A, the end portion 37a of the connection member 34 and the connection hole 23 of the magazine 2a are illustrated. Since the end portion 37b and the connection hole 23 of the magazine 2b are structured substantially similarly to the end portion 37a and the connection hole 23 of the magazine 2a, the description and illustration of the end portion 37b and the connection hole 23 of the magazine 2b are omitted.

As illustrated in FIG. 7A, the connection protrusion 38 is formed on the end portion 37a of the connection arm 36a so as to extend downward. The connection hole 23 is formed in the rear portion wall 21e of the magazine 2a. The connection hole 23 has an opening 23a and an opening 23b. The opening 23a is open on the rear surface 21d side of the magazine 2a, and the opening 23b is open on the upper wall surface 21a side of the magazine 2a.

The connection hole 23 has an inclined surface 23s formed therein. The inclined surface 23s is inclined toward the opening 23a. Seen from the opening 23a, the inclined surface 23s is an upslope. The connection hole 23 also has a recess 23k formed between a front surface 23f and a rear surface 23h thereof. The recess 23k is recessed downward from an end surface (rear surface 23h) of the inclined surface 23s.

FIG. 7A illustrates a state in which loading of the magazine 2a is started. As illustrated in FIG. 7A, when the magazine 2a is pushed into the housing 1e through the magazine loading opening 1a by the operator, the magazine 2a moves into the housing 1e in the insertion direction (L-direction).

In so doing, before the magazine 2a is inserted into the housing 1e by the operator, the controller 12 causes the transportation mechanism 30 to move to stand by at the standby position T, which is preset near the front panel 1f. The magazine 2a is moved close to the connection member 34, and a front surface 38f of the connection protrusion 38 opposes the opening 23a of the connection hole 23.

FIG. 7B illustrates a state in which the connection protrusion 38 is entering the connection hole 23. As illustrated in FIG. 7B, when the connection protrusion 38 enters the connection hole 23 through the opening 23a, the front surface 38f of the connection protrusion 38 contacts the inclined surface 23s formed in the connection hole 23. An inclined surface 38s formed on a lower surface of the connection protrusion 38 is moved onto the inclined surface 23s of the connection hole 23.

At this time, the connection member 34 temporarily moves upward by a distance equal to or slightly greater than the height of the rear surface 23h. The inclined surface 38s of the connection protrusion 38 is inclined downward from the front surface 38f to a rear surface 38h to facilitate movement of the connection protrusion 38 onto the inclined surface 23s.

FIG. 7C illustrates a state in which the connection protrusion 38 is engaged with the connection hole 23. As illustrated in FIG. 7C, when the connection protrusion 38 further moves into the connection hole 23, the connection protrusion 38 falls off from the inclined surface 23s owing to the weight of the connection member 34 and is fitted into the recess 23k.

Since the connection protrusion 38 is fitted into the recess 23k as described above, the front surface 38f of the connection protrusion 38 contacts the front surface 23f of the connection hole 23. Thus, the connection protrusion 38 is not allowed to move out of the connection hole 23. In this state, engagement of the connection protrusion 38 with the connection hole 23 is complete.

Because of this engagement, the operator is not allowed to push the magazine 2a further into the housing 1e. That is, owing to this engagement, the connection member 34 functions as a stopper with which a situation in which the magazine 2a moves into the housing 1e beyond the standby position T is avoided. Thus, connection of the magazine 2a to the transportation mechanism 30 using the connection member 34 is complete.

Likewise, when the magazine 2b is inserted into the housing 1e through the magazine loading opening 1b by the operator, the connection protrusion 38 of the end portion 37b is engaged with the connection hole 23 of the magazine 2b. Accordingly, connection of the magazine 2b to, the transportation mechanism 30 using the connection member 34 may be complete.

Figure 8A:
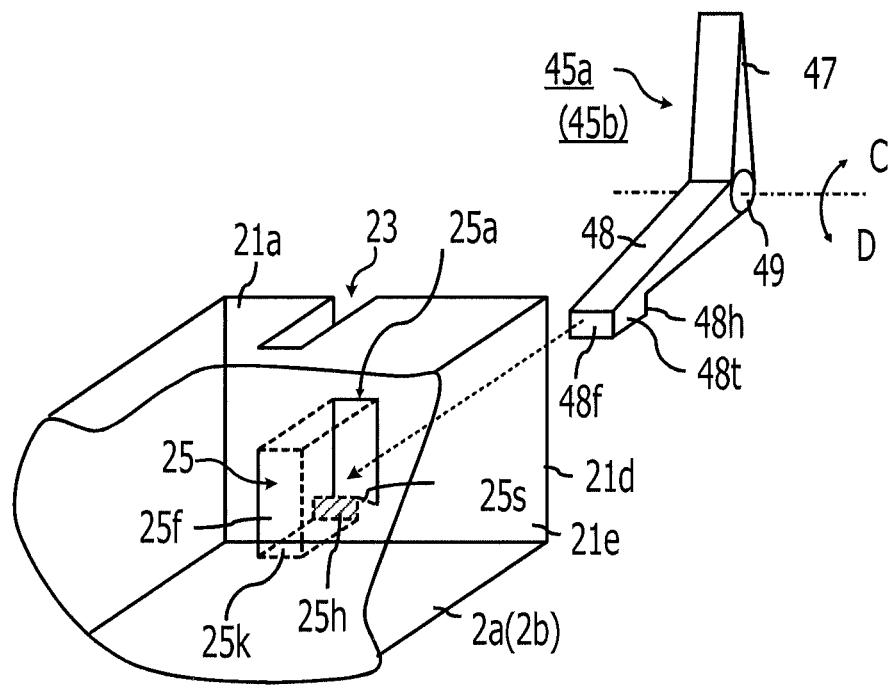
FIGS. 8A and 8B illustrate an example of the relationship between a magazine lock and a lock hole.
Figure 8B:
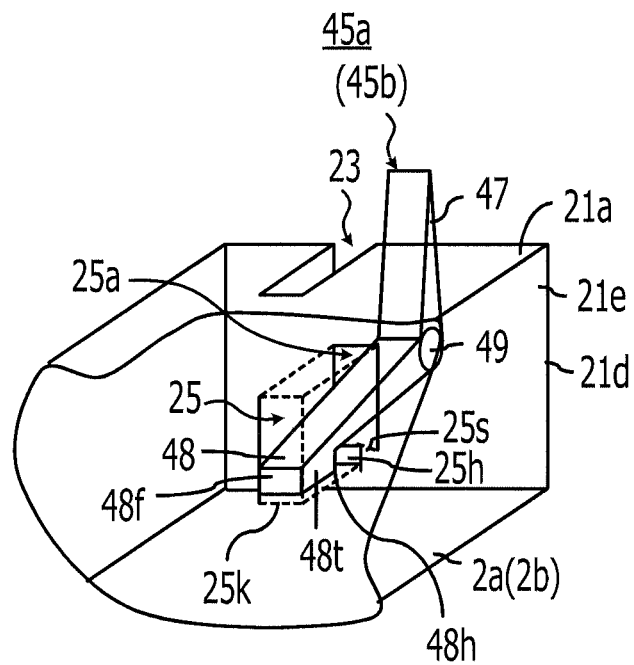

FIGS. 8A and 8B illustrate an example of the relationship between the magazine lock 45a or 45b and one of the lock holes 25. Engagement of each of the magazine locks 45a and 45b with the lock hole 25 of a corresponding one of the two magazines 2a and 2b is described with reference to common diagrams FIGS. 8A and 8B.

As illustrated in FIGS. 8A and 8B, the first lock arm 47 forms an angle of about 90° with the second lock arm 48 around the pivotal shaft 49 in each of the magazine locks 45a and 45*b*. The first lock arm 47 of each of the magazine locks 45*a* and 45*b* is directed in an upward direction of the housing 1*e*.

The second lock arms 48 of the magazine locks 45*a* and 45*b* are respectively directed toward the magazine loading openings 1*a* and 1*b*. An acute angle is formed at the end of each first lock arm 47 so that an external force may easily be applied to the end of the first lock arm 47. In the present embodiment, the external force is applied by the robot mechanism 33 of the transportation mechanism 30. This will be described later. A lock protrusion 48*t*, which is an example of a second locking portion, is formed so as to, extend downward at an end of each second lock arm 48.

The magazine locks 45*a* and 45*b* are designed such that, when no external force is applied thereto, the second lock arm's 48 slightly pivot downward owing to the weight of the second lock arms 48. When an external force is applied to the first lock arms 47, the magazine lock 45*a* and 45*b* are pivoted upward, thereby setting the second lock arms 48 in the horizontal direction.

The lock hole 25 has an opening 25*a* on the rear surface 21*d* of each of the magazines 2*a* and 2*b*. The magazine locks 45*a* and 45*b* are inserted through the corresponding openings 25*a*. Each lock hole 25 has an inclined surface 25*s* formed therein. The inclined surface 25*s* is inclined toward the opening 25*a*. Seen from the opening 25*a*, the inclined surface 25*s* is an upslope. The lock hole 25 also has a recess 25*k* formed between a front surface 25*f* and a rear surface 25*h* thereof. The recess 25*k* is recessed downward from an end surface (rear surface 25*h*) of the inclined surface 25*s*.

FIG. 8A illustrates a state in which the lock protrusion 48*t* is entering the lock hole 25. As illustrated in FIG. 8A, when the lock protrusion 48*t* enters the lock hole 25 through the opening 25*a*, a front surface 48*f* of the lock protrusion 48*t* contacts the inclined surface 25*s* formed in the lock hole 25.

The lock protrusion 48*t* moves onto the inclined surface 25*s*. A surface of the lock protrusion 48*t* that contacts the inclined surface 25*s* may be inclined downward from the front surface 48*f* toward a rear surface 48*h* in order for the lock protrusion 48*t* to easily slide.

FIG. 8B illustrates state in which the lock protrusion 48*t* is engaged with the lock hole 25. When the magazines 2*a* and 2*b* further move into the housing 1*e*, each of the lock protrusion 48*t* further moves into a corresponding one of the lock holes 25 along the inclined surface 25*s* of the lock hole 25. In so doing, the magazine locks 45*a* and 45*b* temporarily pivot in an upward direction C.

After that, when the rear surface 48*h* of the lock protrusion 48*t* reaches the rear surface 25*h* of the lock hole 25, the second lock arm 48 pivots in an opposite downward direction D owing to the weight of the second lock arm 48, thereby causing the lock protrusion 48*t* to enter the recess 25*k* as illustrated in FIG. 8B. Accordingly, the magazine locks 45*a* and 45*b* may lock the magazines 2*a* and 2*b*.

After the magazines 2*a* and 2*b* are locked, even when the operator attempts to pull the magazine 2*a* or 2*b*, the rear surface 48*h* of the lock protrusion 48*t* hooks to the rear surface 25*h* of the lock hole 25. Thus, the operator is not allowed to pull out the magazine 2*a* or 2*b*.

As described above, by applying an external force to the first lock arm 47 to set the second lock arm 48 in the horizontal direction, the second lock arm 48 may be moved from a lock position to the lock release position. Accordingly, engagement of the magazine locks 45*a* and 45*b* with the corresponding lock holes 25 may be released.

Although an example of engagement of the lock protrusion 48*t* and the lock hole 25 is described, each of the magazines 2*a* and 2*b* may include a hooking member instead of the lock hole 25. Alternatively, the lock protrusion 48*t* may have a lock hole, to which the hooking member is hooked. The details of a method of releasing a lock will be described later.

Figure 9A:
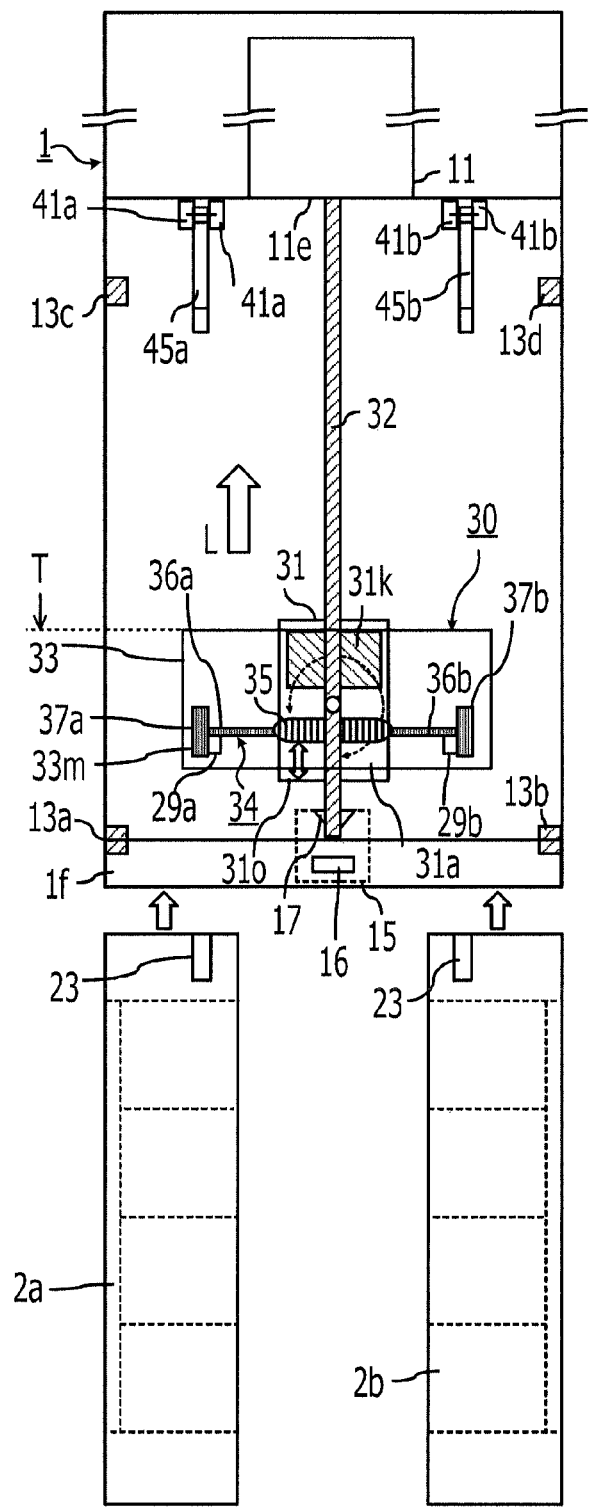
FIGS. 9A and 9B are first diagrams of an example of a magazine loading operation.
Figure 9B:
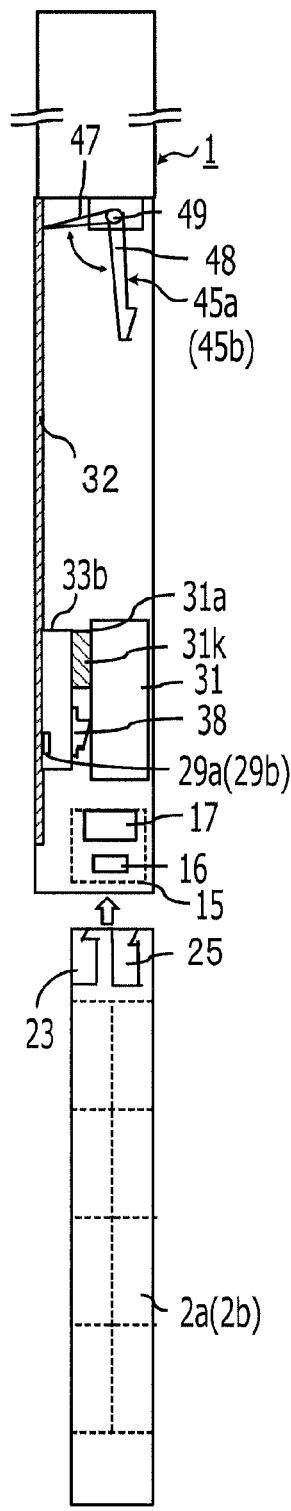

FIGS. 9A and 9B are first diagrams of an example of a magazine loading operation. FIG. 9A is a conceptual view of the housing 1*e* seen from above, and FIG. 9B is a conceptual view of the housing 1*e* seen from a side. FIGS. 9A and 9B illustrate a state in which loading of the magazines 2*a* and 2*b* is started.

When the magazines 2*a* and 2*b* are respectively inserted into the housing 1*e* through the magazine loading openings 1*a* and 1*b* by the operator, the rear portion walls 21*e* of the magazines 2*a* and 2*b* enter the housing 1*e* in the insertion direction (L-direction). The magazines 2*a* and 2*b* are further moved into the housing 1*e*, pass the first detection sensors 13*a* and 13*b*, and reach corresponding magazine loading start positions M. Accordingly, the controller 12 may recognize the start of loading of the magazines 2*a* and 2*b* into the housing 1*e* because of reception of detection results of the first detection sensors 13*a* and 13*b*.

After the magazines 2*a* and 2*b* are removed from the housing 1*e* through the magazine loading openings 1*a* and 1*b* by the operator, the controller 12 causes the transportation mechanism 30 to move to and stand by at the standby position T, which is preset at a position near the front panel 1*f*. This allows the transportation mechanism 30 to stand by at the standby position T before the magazines 2*a* and 2*b* are inserted through the magazine loading openings 1*a* and 1*b* by the operator.

In so doing, the controller 12 causes the hand mechanism 31 to rotate using the hand mechanism rotating motor 33*q* so that the transportation opening 31*o* of the hand mechanism 31 is directed toward the front panel 1*f*. This may cause the connection member 34 to oppose the upper surface 31*a* of the hand mechanism 31 to be held by the upper surface 31*a* of the hand mechanism 31 as illustrated in FIG. 6B. That is, the connection protrusions 38 of the end portions 37*a* and 37*b* may protrude from the base 33*b* in advance.

When the magazines 2*a* and 2*b* are further pushed into the housing 1*e* by the operator, the magazines 2*a* and 2*b* gradually approach the connection member 34 as illustrated in FIG. 7A, and the openings 23*a* of the connection holes 23 oppose the front surfaces 38*f* of the connection protrusions 38 that protrude from the base 33*b*.

Figure 10A:
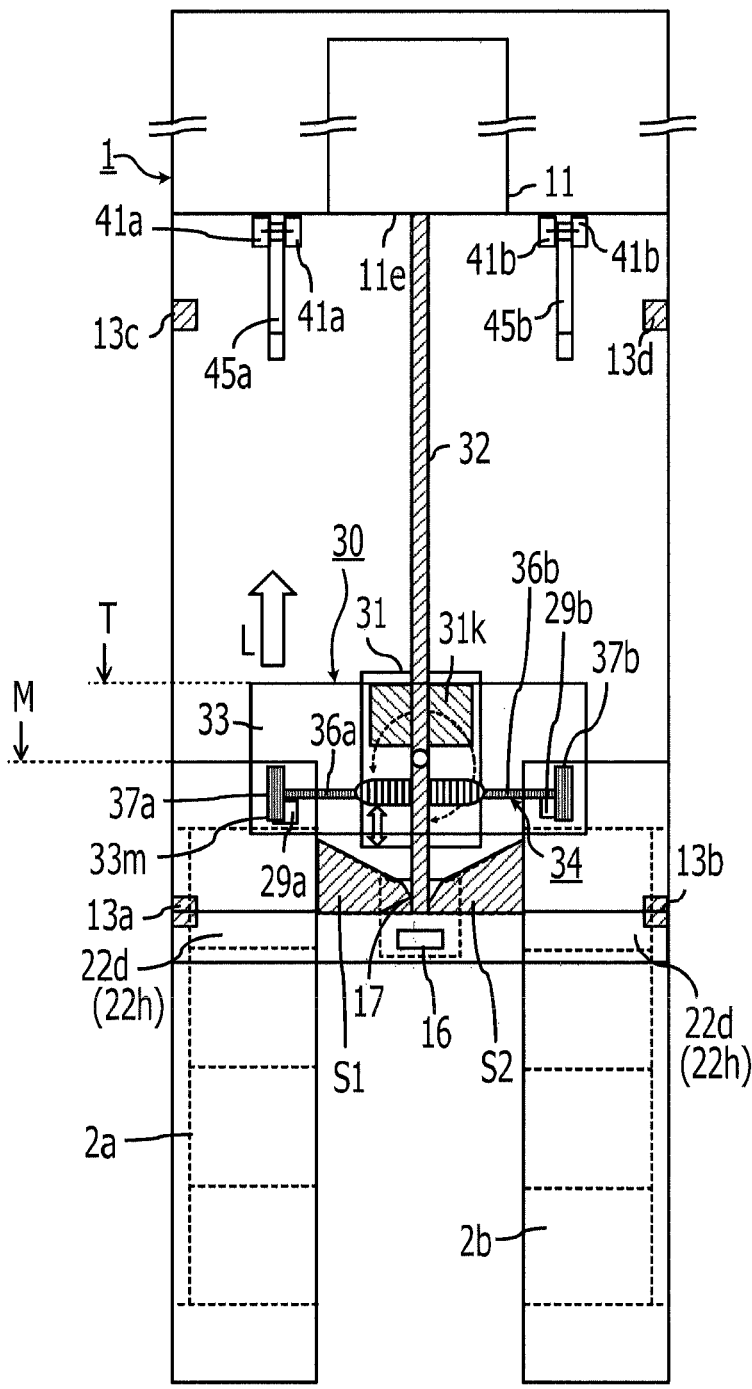
FIGS. 10A and 10B are second diagrams of the example of the magazine loading operation.
Figure 10B:
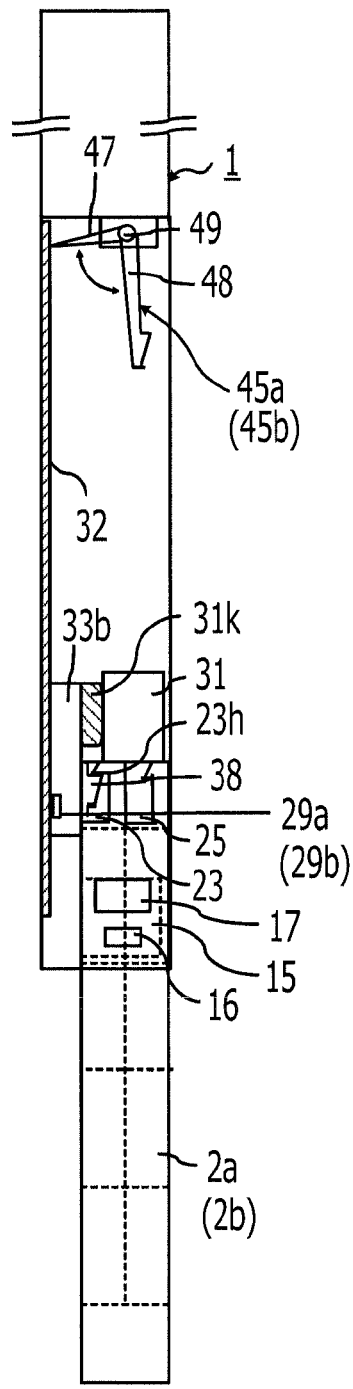

FIGS. 10A and 10B are second diagrams of the example of the magazine loading operation. FIG. 10A is a conceptual view of the housing 1*e* seen from above, and FIG. 10B is a conceptual view of the housing 1*e* seen from a side. FIGS. 10A and 10B illustrate a state in which the magazines 2*a* and 2*b* are connected to the transportation mechanism 30 using the connection member 34.

The connection protrusions 38 of the end portions 37*a* and 37*b* gradually enter the corresponding connection holes 23 through the openings 23*a*. As illustrated in FIG. 7B, the front surface 38*f* of each connection protrusion 38 contacts the inclined surface 23*s* of the corresponding connection hole 23, and the inclined surface 38*s* formed on the lower surface of each connection protrusion 38 is moved onto the inclined surface 23*s* of the corresponding connection hole 23.

At this time, the connection member 34 temporarily moves upward by a distance equal to or slightly greater than the height of the rear surface 23*h*. When the connection protrusion 38 is further moved into the connection hole 23, the connection protrusion 38 falls off from the inclined surface 23*s* owing to the weight of the connection member 34 and is fitted into the recess 23*k*. That is, when the connection member 34 is engaged with the connection hole 23, the connection member 34 initially moves up and, after that, falls off.

Accordingly, the connection member 34 may move relative to the third detection sensors 29a and 29b, that is, the connection member 34 may move close to or move away from the third detection sensors 29a and 29b. That is, the third detection sensors 29a and 29b may use this movement to detect that the connection member 34 initially moves close to the third detection sensors 29a and 29b, after that, moves away from the third detection sensors 29a and 29b, thereby detecting whether or not the connection member 34 is engaged with the connection holes 23.

Accordingly, the controller 12 may recognize that the connection member 34 is engaged with the connection holes 23 in accordance with the detection results. With the above-described operation, connection of the magazines 2a and 2b to the transportation mechanism 30 using the connection member 34 is complete. The controller 12, which recognizes the completion of engagement because of reception of the detection results from the first detection sensors 13a and 13b and the third detection sensors 29a and 29b, causes automatic loading of the magazines 2a and 2b to be started.

The standby position T is preset in accordance with left and right image capturing ranges S1 and S2 of the reader unit 15. Specifically, the standby position T is preset such that the rearmost upper and lower slots 22d and 22h of the magazine 2a connected to the transportation mechanism 30 are positioned within the image capturing range S1 of the reader unit 15 and the rearmost upper and lower slots 22d and 22h of the magazine 2b connected to the transportation mechanism 30 are positioned within the image capturing range S2 of the reader unit 15. With this arrangement, the mirror portion 17 reflects an image of the upper slot 22d and lower slot 22h of each of the two magazines 2a and 2b toward the area CCD 16.

Accordingly, the area CCD 16 may capture the image of four magnetic tape cartridges 5 stored in the upper and lower slots 22d and 22h. The processing circuit 15c of the reader unit 15 processes the captured image to read the bar code labels 5l of four magnetic tape cartridges 5. The processing circuit 15c of the reader unit 15 transmits bar code information of these bar code labels 5l to the controller 12. Since the mirror portion 17 is used, the captured images are mirror images. The processing circuit 15c of the reader unit 15 performs a process that handles mirror images.

After that, the controller 12 controls the movement amount of the transportation mechanism 30 to cause the transportation mechanism 30 to move from the standby position T step by step by a distance equal to the width of one of the slots 22a to 22h in a direction parallel to the insertion direction (L-direction) of the magazines 2a and 2b. The width of each of the slots 22a to 22h of the magazines 2a and 2b is predetermined in the design.

For this reason, when a stepping motor is used for the robot motor 33p, by controlling the movement amount in accordance with the number of steps, the robot mechanism 33 (transportation mechanism 30) may be moved step by step by a distance equal to the width of one of the slots 22a to 22h.

A distance equal to the width of one of the slots 22a to 22h of each of the magazines 2a and 2b and the transportation speed of the robot mechanism 33 when transporting the magnetic tape cartridge 5 (referred to as the "cartridge transportation speed" hereafter) during an operation are predetermined in the design. Thus, a time taken to move the transportation mechanism 30 by a distance equal to the width of one of the slots 22a to 22h is obtainable from the cartridge transportation speed of the robot mechanism 33. Accordingly, the controller 12 may control the movement amount in accordance with the driving time of the robot motor 33p, thereby moving the transportation mechanism 30 step by step by a distance equal to the width of one of the slots 22a to 22h.

Accordingly, by controlling the movement amount of the transportation mechanism 30, the bar code labels 5l of the magnetic tape cartridges 5 stored in the slots 22a to 22h may be positioned within a corresponding one of the left and right image capturing ranges S1 and S2 of the reader unit 15. The area CCD 16 captures an image every time, the target bar code labels 5l are entirely positioned within a corresponding one of the image capturing ranges S1 and S2.

The controller 12 may control the transportation speed of the transportation mechanism 30 (referred to as the "magazine transportation speed" hereafter) at which the magazines 2a and 2b are transported. In this case, the magazine transportation speed may be lower than the cartridge transportation speed.

The controller 12 controls the magazine transportation speed of the transportation mechanism 30 (robot mechanism 33) to a speed at which the reader unit 15 may continuously read the bar code labels 5l of the magnetic tape cartridges 5 stored in the slots 22a to 22h. That is, the controller 12 controls the speed of the robot motor 33p to a speed predetermined in accordance with reading accuracy with which the reader unit 15 reads the bar code labels 5l of the magnetic tape cartridges 5 stored in the slots 22a to 22h.

Specifically, it is sufficient that the magazine transportation speed is set to a speed at which the area CCD 16 may continuously capture images of the slots 22a to 22h without blurring. The magazine transportation speed may be obtained in accordance with capturing conditions such as the type of the area CCD 16, the exposure time of the area CCD 16, shake of the target, and the like. For example, the magazine transportation speed is set to a speed that is sufficiently lower than a speed at which the magnetic tape cartridges 5 may be captured within the exposure time of the area CCD 16.

The following advanced speed control may be performed. That is, when the target bar code labels 5l are entirely positioned within a corresponding one of the image capturing ranges S1 and S2, the magazine transportation speed is set at an image capturing speed that is sufficiently lower than a speed at which the magnetic tape cartridges 5 may be captured within the exposure time of the area CCD 16; and the magazine transportation speed is set at a speed higher than the image capturing speed until the next target bar code labels 5l are entirely positioned within a corresponding one of the image capturing ranges S1 and S2.

By doing this, the bar code labels 5l of the magnetic tape cartridges 5 are positioned relative to the reader unit 15 while the transportation mechanism 30 is being moved. The area CCD 16 captures an image every time the bar code labels 5l of the magnetic tape cartridges 5 stored in the slots out of the slots 22a to 22h are entirely positioned within a corresponding one of the image capturing ranges S1 and S2.

The processing circuit 15c of the reader unit 15 sequentially processes these captured images to read bar code information, and transmits the read bar code information to the controller 12. The controller 12 creates the cartridge storing management table using the received bar code information to complete an inventory operation. The cartridge storing management table is used to manage the types and storing positions of the magnetic tape cartridges 5.

Accordingly, the identifiers of the magnetic tape cartridges 5 may be automatically positioned relative to the reader unit 15. This automatic positioning may be performed in accordance with reading performance or reading timing of the reader unit 15. This allows the identifiers of the magnetic tape cartridges 5 to be reliably read.

Also according to the present embodiment, the area CCD 16 performs image capturing four times to allow the reader unit 15 to read a total of 16 bar code labels 5l of the magnetic tape cartridges 5 of the magazines 2a and 2b. Accordingly, the time taken for the inventory operation may be further decreased.

Figure 11A:
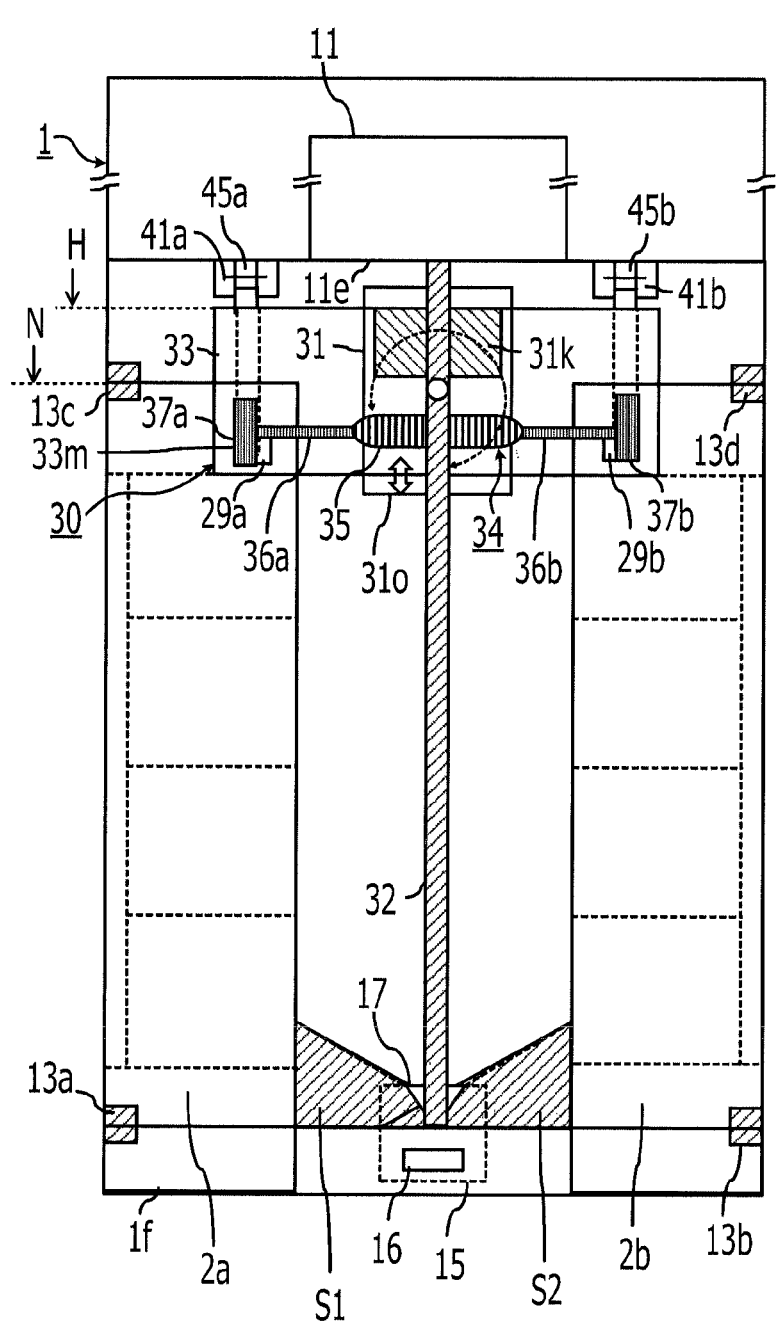
FIGS. 11A and 11B are third diagrams of the example of the magazine loading operation.
Figure 11B:
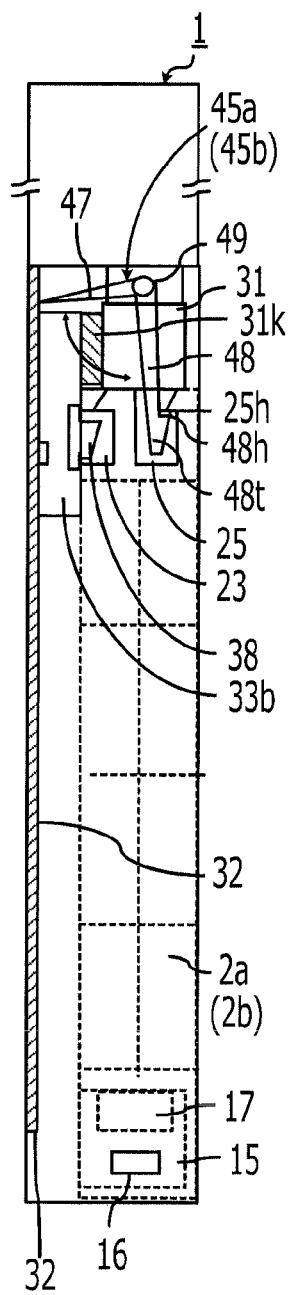

FIGS. 11A and 11B are third diagrams of the example of the magazine loading operation. FIG. 11A is a conceptual view of the housing 1e seen from above, and FIG. 11B is a conceptual view of the housing 1e seen from the side. In FIGS. 11A and 11B, the transportation mechanism 30 has pulled the magazines 2a and 2b into the housing 1e, and loading of the magazines 2a and 2b has been complete.

As described above, the controller 12 causes the transportation mechanism 30 to move finally to a magazine transportation completion position H on the rear side of the library apparatus 1. During the transportation, that is, before the magazines 2a and 2b reach the corresponding magazine loading completion positions N, the magazine locks 45a and 45b oppose the lock holes 25 of the magazines 2a and 2b. The lock protrusions 48t move along the inclined surfaces 25s of the corresponding lock holes 25. In so doing, the magazine locks 45a and 45b temporarily pivot in the upward direction C.

After that, when the rear surface 48h of each lock protrusion 48t reaches the rear surface 25h of the corresponding lock hole 25, the second lock arm 48 pivots in an opposite downward direction D owing to the weight of the second lock arm 48. This causes the lock protrusion 48t to enter the recess 25k as illustrated in FIG. 8B. Accordingly, the magazine locks 45a and 45b may respectively lock the magazines 2a and 2b.

When the magazines 2a and 2b pass the second detection sensors 13c and 13d, the second detection sensors 13c and 13d detect completion of loading of the magazines 2a and 2b and transmit the detection results to the controller 12. The controller 12 receives these detection results and the result of processing performed by the processing circuit 15c of the reader unit 15 to recognize completion of an obtaining operation of bar code information used for the inventory operation.

When the processing circuit 15c of the reader unit 15 fails to process an image, the transportation mechanism 30 is returned in a direction parallel to the ejection direction (E-direction) of the magazines 2a and 2b, and is moved again in a direction parallel to the insertion direction (L-direction) of the magazines 2a and 2b.

By doing this, the bar code labels 5l which the reader unit 15 failed to read are moved again into a corresponding one of the image capturing ranges S1 and S2 to be positioned. In so doing, in order for the area CCD 16 to reliably capture the bar code labels 5l, the magazines 2a and 2b may be temporarily stopped, or the transportation speed may be controlled to a lower speed.

The reader unit 15 again reads the bar code labels 5l which the reader unit 15 failed to read. Accordingly, the library apparatus 1 may automatically reread the bar code labels 5l to reliably obtain bar code information of the bar code labels 5l. When the reader unit 15 fails to reread the bar code labels 5l in the above-described operation, the rereading operation will be repeated a few times. When the reader unit 15 still fails to read the bar code labels 5l after the repeated rereading operation, it is highly probable that the rereading operation failed because the bar code labels 5l are peeled or smudged, or there is another faulty condition.

In this case, the controller 12 determines that a loading error occurred. The controller 12 stops the inventory operation and makes the magazines 2a and 2b be ejectable through the magazine loading openings 1a and 1b by the operator. In order to do this, the controller 12 causes the transportation mechanism 30 to move to the transportation completion position H, and releases a lock using the magazine locks 45a and 45b and connection of the magazines 2a and 2b to the connection member 34 as described later. After that, the controller 12 causes the operator panel 3 to indicate that a loading error occurred, thereby prompting the operator to eject the magazines 2a and 2b.

Figure 12A:
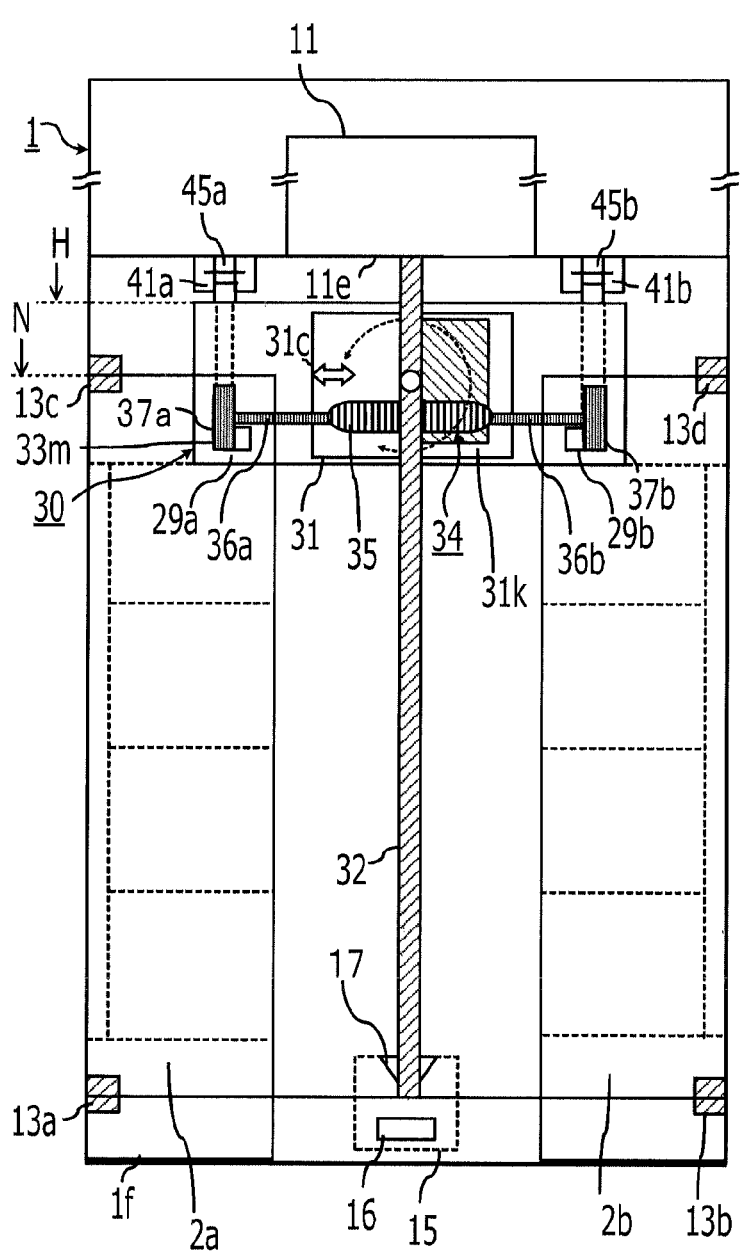
FIGS. 12A and 12B are fourth diagrams of the example of the magazine loading operation.
Figure 12B:
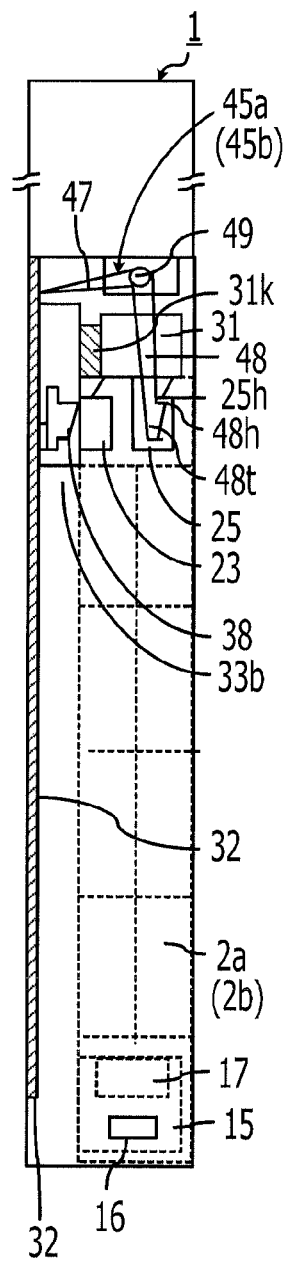

FIGS. 12A and 12B are fourth diagrams of the example of the magazine loading operation. FIG. 12A is a conceptual view of the housing 1e seen from above, and FIG. 12B is a conceptual view of the housing 1e seen from a side. FIGS. 12A and 12B illustrate the library apparatus 1 in a command standby state (a ready state).

Upon receiving the detection results from the second detection sensors 13c and 13d, the controller 12 instructs the hand mechanism rotating motor 33q of the hand mechanism 31 to turn the hand mechanism 31 clockwise by 90°. By doing this, the step portion 31k rotates to cause the connection member 34 to move onto the step portion 31k.

Accordingly, the connection protrusions 38 of the connection arms 36a and 36b move into the opening 33o. Because of this interlocked movement, the connection protrusions 38 of the end portions 37a and 37b move away from the connection holes 23 of the magazines 2a and 2b, respectively. Thus, connection of the magazines 2a and 2b to the connection member 34 is released.

The library apparatus 1, in accordance with a command from the host computer (not illustrated), pulls the target magnetic tape cartridge 5 out of the magazine 2a or 2b, transports the magnetic tape cartridge 5 to the magnetic tape drive 11, and enters a state in which the library apparatus 1 may record in or playback the magnetic tape cartridge 5. Accordingly, the library apparatus 1 enters the command standby state (ready state) in which the library apparatus 1 may receive and respond to a command from the host computer, and waits for a command from the host computer.

Accordingly, the library apparatus 1 according to the present embodiment may automatically perform the loading operation of the magazines 2a and 2b when the magazines 2a and 2b are connected to the transportation mechanism 30. That is, the identifiers of the magnetic tape cartridges 5 may be automatically positioned relative to the reader unit 15. This automatic positioning may be performed in accordance with reading performance or reading timing of the reader unit 15. This allows the identifiers of the magnetic tape cartridges 5 to be reliably read.

Since the identifiers of the magnetic tape cartridges 5 may be reliably read during the loading operation of the magazines 2a and 2b, a time taken for the inventory operation may be decreased and a time taken to enter the ready state may be decreased.

FIGS. 13A and 13B are first diagrams of an example of states of the connection member 34 and the magazine locks 45a and 45b during the operation. FIG. 13A is a conceptual view of the housing 1e seen from above, and FIG. 13B is a conceptual view of the housing 1e seen from a side.

Upon receiving a host command, the controller 12 refers to the cartridge storing management table to determine the slot out of the slots 22a to 22h in which the target magnetic tape cartridge 5 is stored, and instructs the transportation mechanism 30 to transport the target magnetic tape cartridge 5.

The robot mechanism 33 linearly moves to the target one of the slots 22a to 22h in a direction parallel to the ejection direction (E-direction) of the magazines 2a and 2b. The hand mechanism 31 rotates to direct the transportation opening 31o for the magnetic tape cartridge 5 toward the target one of the slots 22a to 22h. When the target one of the slots 22a to 22h is provided in the magazine 2b, the transportation opening 31o is directed toward the right side as illustrated in FIG. 13A.

As illustrated in FIG. 13B, since the connection member 34 has moved onto the step portion 31k, the connection protrusions 38 of the connection arms 36a and 36b are retracted in the connection member retracting hole 33m of the base 33b.

When the target one of the slots 22a to 22h exists in the magazine 2a, the transportation opening 31o is directed toward the left side similarly to the state illustrated in FIG. 12A. Similarly to the state illustrated in FIG. 12B, since the connection member 34 has moved onto the step portion 31k, the connection protrusions 38 of the connection arms 36a and 36b are retracted in the connection member retracting hole 33m of the base 33b.

During the operation following the ready state, the transportation opening 31o is ordinarily directed only toward the left, right, or rear side of the housing 1e. Accordingly, by controlling a rotational direction of the hand mechanism 31 so as not to direct the transportation opening 31o toward the front side (the front panel 1f side) of the housing 1e, the connection protrusions 38 may be ordinarily retracted in the connection member retracting hole 33m of the base 33b. Accordingly, the connection member 34 is not accidentally engaged with the connection holes 23 even when the connection member 34 opposes the connection holes 23.

The magazine locks 45a and 45b are engaged with the lock holes 25. Also, the magazine locks 45a and 45b are not subject to an external force, are set to a free state, and are pivotable. In this state, when the operator attempts to pull out the magazines 2a and 2b, the rear surfaces 48h of the lock protrusions 48t of the magazine locks 45a and 45b are hooked to the rear surfaces 25h of the lock holes 25.

When the operator further attempts to pull out the magazines 2a and 2b, the magazine locks 45a and 45b are pivoted in the downward direction D because of the pulling force applied to the magazine locks 45a and 45b. Accordingly, the magazine locks 45a and 45b respectively may lock the magazines 2a and 2b, thereby avoiding a situation in which the magazines 2a and 2b are pulled out by the operator.

FIGS. 14A and 14B are second diagrams of an example of states of the connection member 34 and the magazine locks 45a and 45b during the operation. FIG. 14A is a conceptual view of the housing 1e seen from above, and FIG. 14B is a conceptual view of the housing 1e seen from a side. FIGS. 14A and 14B illustrate a state in which the hand mechanism 31 moves the magnetic tape cartridge 5 into or out of the insertion and ejection opening 11e of the magnetic tape drive 11.

In this state, the transportation mechanism 30 is positioned at the magazine transportation completion position H near the magnetic tape drive 11. The transportation opening 31o of the hand mechanism 31 is directed toward the insertion and ejection opening 11e of the magnetic tape drive 11. The hands 31h of the hand mechanism 31 push out the magnetic tape cartridge 5 from the transportation opening 31o to the insertion and ejection opening 11e or pull the magnetic tape cartridge 5 from the insertion and ejection opening 11e into the transportation opening 31o.

As illustrated in FIG. 14A, a magazine lock release position J is set at a position further rearward than the magazine transportation completion position H in the library apparatus 1. That is, during the operation, since the controller 12 controls the transportation mechanism 30 such that the transportation mechanism 30 does not move further rearward than the magazine transportation completion position H, the transportation mechanism 30 does not move to the magazine lock release position J. Accordingly, a situation in which the magazine locks 45a and 45b are accidentally released by the transportation mechanism 30 during the operation is avoided.

Since the connection member 34 has moved onto the step portion 31k, as illustrated in FIG. 14B, the connection protrusions 38 of the connection arms 36a and 36b are retracted in the connection member retracting hole 33m of the base 33b. That is, the connection protrusions 38 are in the same state as illustrated in FIG. 6C.

The magazine locks 45a and 45b are engaged with the lock holes 25. In this state, the magazine locks 45a and 45b are not subject to an external force, are set to a free state, and are pivotable.

When the operator attempts to pull out the magazines 2a and 2b in this state, the magazine locks 45a and 45b are pivoted in the downward direction D. As a result, the rear surfaces 48h of the lock protrusions 48t of the magazine locks 45a and 45b are hooked to the rear surfaces 25h of the lock holes 25. Accordingly, a situation in which the magazines 2a and 2b are pulled out by the operator may be avoided.

Figure 15A:
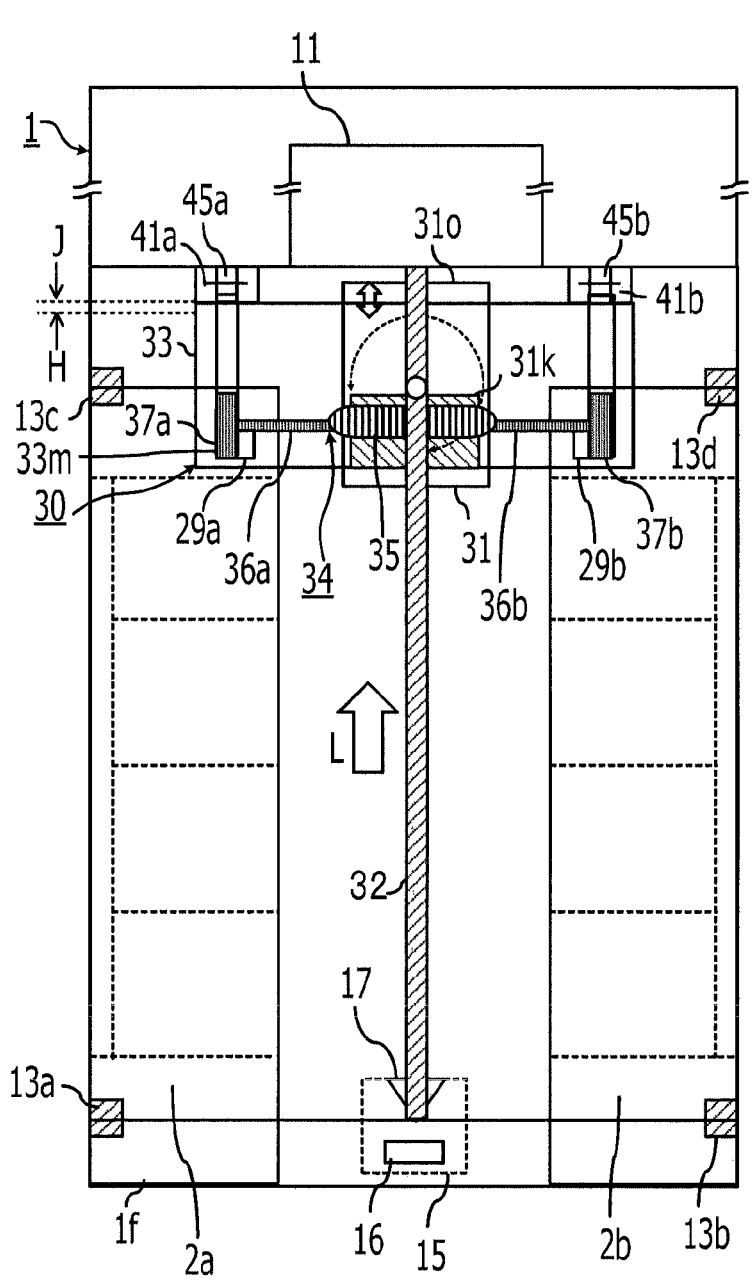
FIGS. 15A and 15B illustrate an example of a method of releasing a lock.
Figure 15B:
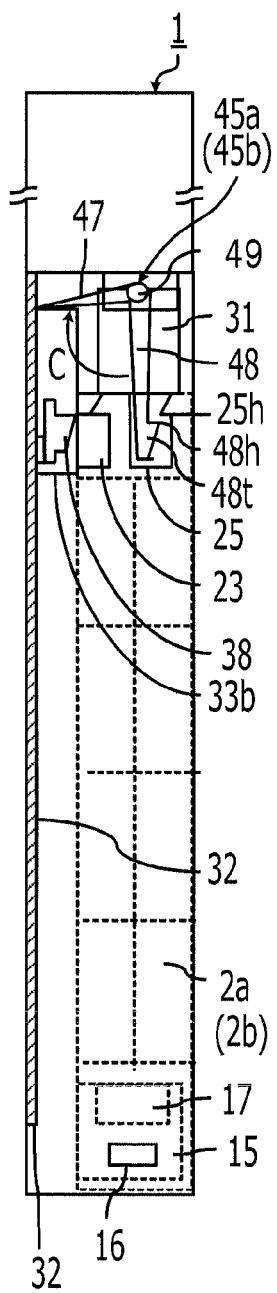

FIGS. 15A and 15B illustrate an example of a method of releasing a lock. FIG. 15A is a conceptual view of the housing 1e seen from above, and FIG. 15B is a conceptual view of the housing 1e seen from a side. The operator operates the operator panel 3 to eject the magazines 2a and 2b. In response to the operation by the operator, the controller 12 completes a specified process, and after that, causes the transportation mechanism 30 to move to the magazine lock release position J.

In order to move the connection member 34 onto the step portion 31k, the controller 12 also causes the hand mechanism rotating motor 33q to drive to make the transportation opening 31o of the hand mechanism 31 be directed toward the rear side of the library apparatus 1. That is, the controller 12 causes the connection protrusion 38 to be set in a state such that the connection protrusions 38 are not engaged with the openings 23b of the connection holes 23 of the magazines 2a and 2b even when the connection protrusions 38 oppose the openings 23b of the connection holes 23 of the magazines 2a and 2b.

After that, the transportation mechanism 30 moves in a direction parallel to the insertion direction (L-direction) of the magazines 2a and 2b to press the first lock arms 47 of the magazine locks 45a and 45b. In response to this movement, the magazine locks 45a and 45b are pivoted in the upward direction C, thereby setting the second lock arms 48 in the horizontal direction. That is, each second lock arm 48 may be moved from the lock position to the lock release position.

As a result, the rear surfaces 48h of the second lock arms 48 are moved away from the rear surfaces 25h of the lock holes 25. Accordingly, engagement of the magazine locks 45a and 45b with the corresponding lock holes 25 may be released. The controller 12 causes the operator panel 3 to blink a lamp or the like, or display a message on a panel to prompt the operator to eject the magazines 2a and 2b.

When the operator pulls out the magazines 2a and 2b, the first detection sensors 13a and 13b and the second detection sensors 13c and 13d detect that the magazines 2a and 2b pass the first detection sensors 13a and 13b and the second detection sensors 13c and 13d. Upon receiving the detection results, the controller 12 detects ejection of the magazines 2a and 2b. When only one of the magazines 2a and 2b is ejected when ejection of the magazines 2a and 2b is attempted, the controller 12 issues an instruction to the operator panel 3.

In order for both of the magazines 2a and 2b to be pulled out, the operator panel 3 blinks a lamp or the like, or displays a message on the panel to prompt the operator to eject the magazines 2a and 2b on the left and right sides.

After that, the controller 12 causes the transportation mechanism 30 to move to the standby position T preset at a position near the front panel 1f, and to stand by until the connection member 34 is connected to the magazines 2a and 2b. In so doing, the controller 12 causes the hand mechanism 31 to rotate using the hand mechanism rotating motor 33q such that the transportation opening 31o of the hand mechanism 31 is directed toward the front panel 1f.

Since the reader unit 15 does not read the identifiers of the magnetic tape cartridges 5 when the magazines 2a and 2b are ejected, ejection of the magazines 2a and 2b is described with an example in which the magazines 2a and 2b are manually ejected by the operator. Alternatively, the magazines 2a and 2b may be automatically ejected using the connection member 34 as described below.

Figure 16A:
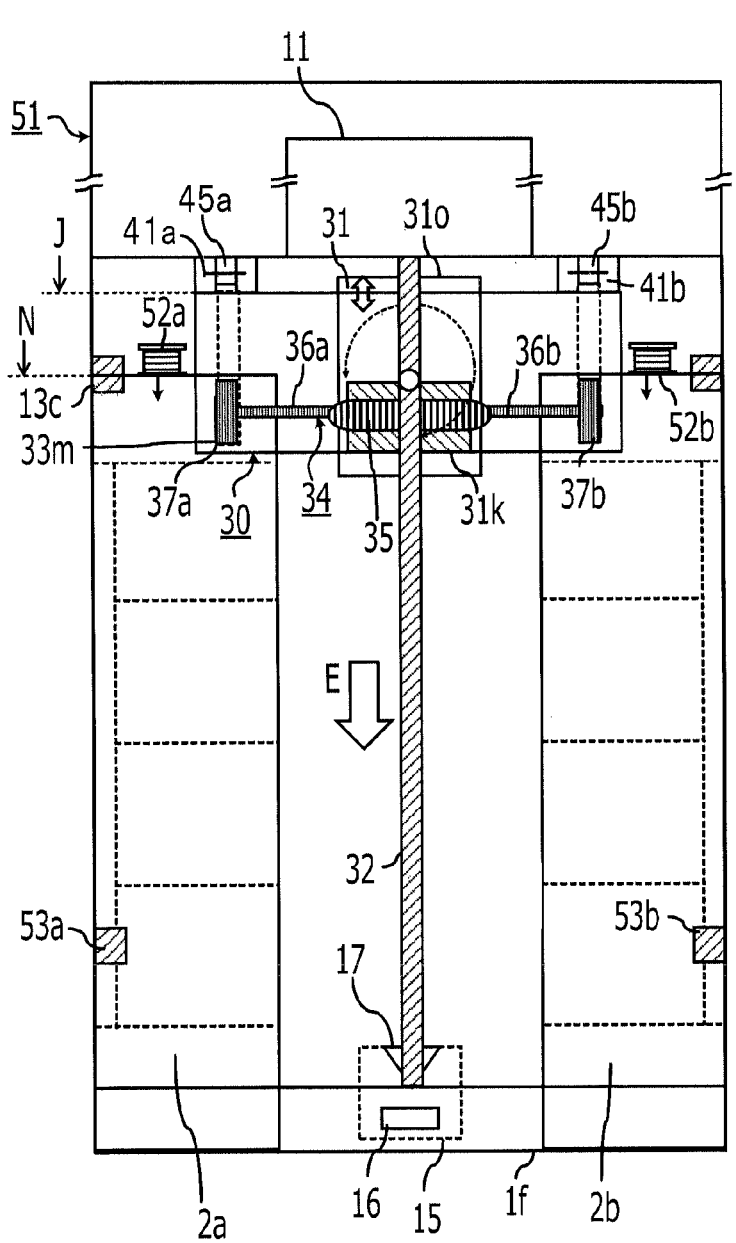
FIGS. 16A and 16B are first diagrams of an example of a magazine ejecting operation.

FIGS. 16A to 18B illustrate a magnetic tape library apparatus 51 according to a second embodiment. Components similar to those in the above-described embodiment will be described with the same reference numerals. FIGS. 16A and 16B are first diagrams of an example of a magazine ejecting operation.

In order to realize automatic ejection of the magazines 2a and 2b using the connection member 34, the library apparatus 51 is described as a different embodiment, which includes ejection assist members at positions of the housing 1e opposing the rear surfaces 21d of the magazines 2a and 2b in the above-described library apparatus 1.

The ejection assist members assists ejection such that the connection member 34 is connected to the magazines 2a and 2b in the same manner as the connection member 34 is connected to the magazines 2a and 2b while being loaded. Specifically, the ejection assist members slightly move the magazines 2a and 2b in the ejection direction (E-direction) so as to allow the openings 23a of the connection holes 23 to oppose the connection protrusions 38.

Figure 16B:
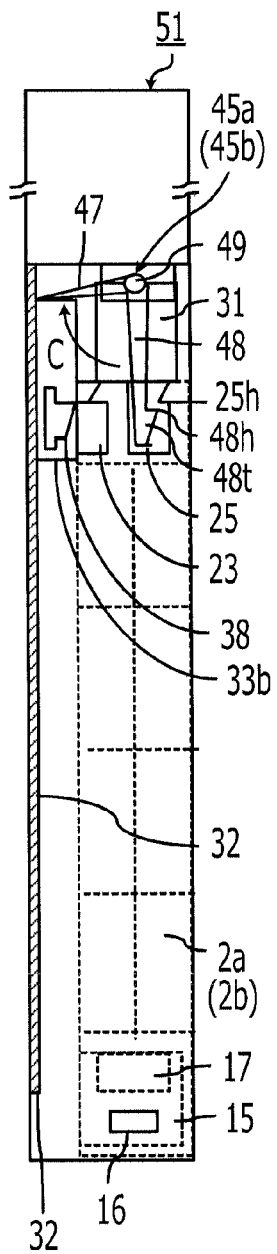

When the ejection assist members use elastic members such as, for example, plate springs, coil springs, or elastic rubber components, the ejection assist members may be easily disposed in a small space. Referring to FIGS. 16A and 16B, an example using coil springs 52 is described. Coil springs 52a and 52b are provided near the magazine loading completion positions N of the magazines 2a and 2b in the housing 1e so as to press the rear surfaces 21d of the corresponding magazines 2a and 2b in the ejection direction (E-direction).

An ejecting operation of the magazines 2a and 2b will be described below. The operator operates the operator panel 3 to eject the magazines 2a and 2b. In response to the operation by the operator, the controller 12 completes a specified process, and after that, causes the transportation mechanism 30 to move to the magazine lock release position 3.

In order to move the connection member 34 onto the step portion 31k, the controller 12 also causes the hand mechanism rotating motor 33q to drive to make the transportation opening 31o of the hand mechanism 31 be directed toward the rear side of the library apparatus 51. That is, the controller 12 causes the connection protrusion 38 to be set in a state such that the connection protrusions 38 are not engaged with the openings 23b of the connection holes 23 of the magazines 2a and 2b even when the connection protrusions 38 oppose the openings 23b of the connection holes 23 of the magazines 2a and 2b.

After that, the robot mechanism 33 moves while pressing the first lock arms 47 of the magazine locks 45a and 45b, thereby setting the second lock arms 48 in the horizontal direction. As a result, the rear surfaces 48h of the second lock arms 48 are moved away from the rear surfaces 25h of the lock holes 25. Accordingly, the lock using the magazine locks 45a and 45b are released.

Figure 17A:
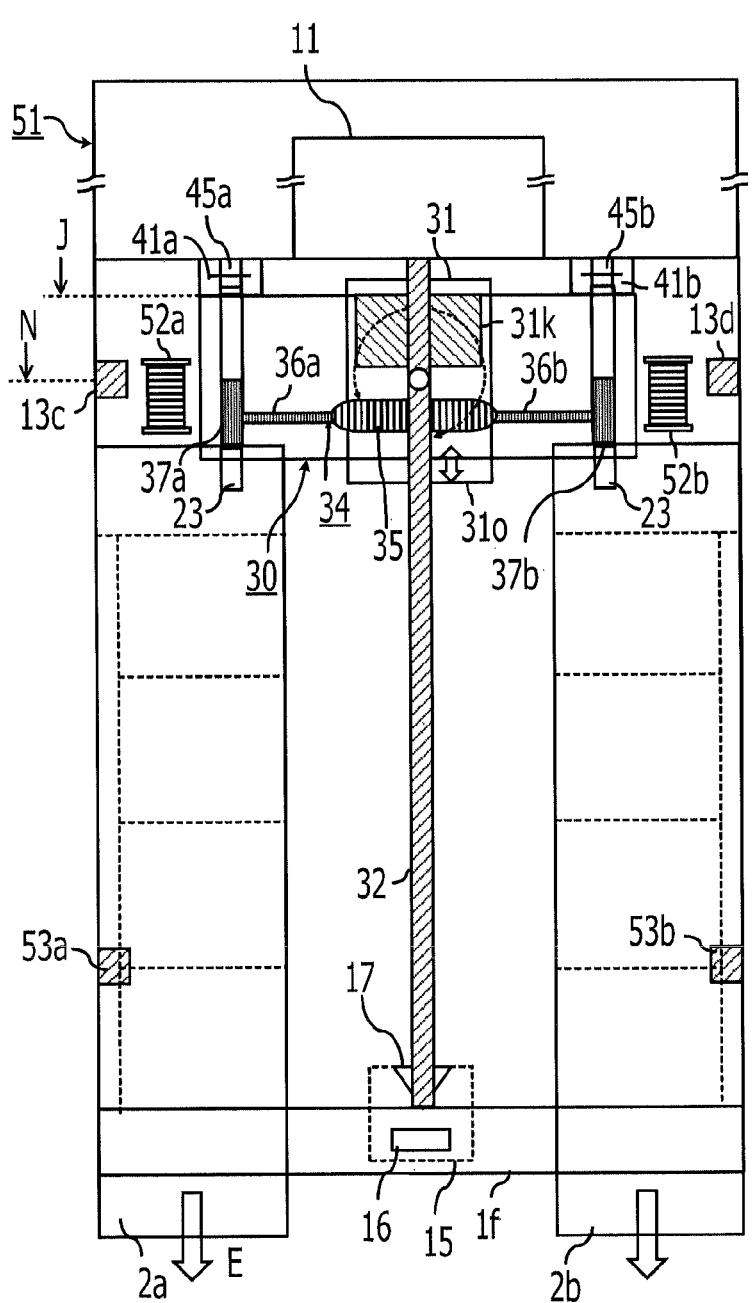
FIGS. 17A and 17B are second diagrams of the example of the magazine ejecting operation.
Figure 17B:
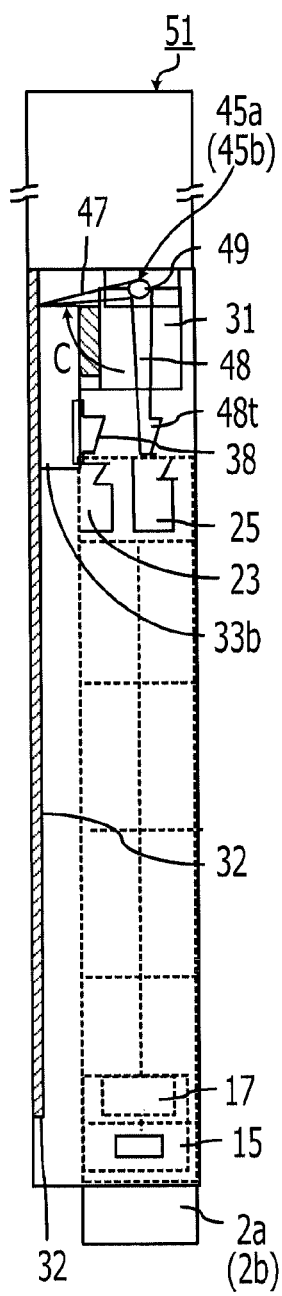

FIGS. 17A and 17B are second diagrams of the example of the magazine ejecting operation. As illustrated in FIGS. 17A and 17B, upon releasing the lock using the magazine locks 45a and 45b, the rear surfaces 21d of the magazines 2a and 2b are pressed in the ejection direction (E-direction) by the coil springs 52a and 52b. Accordingly, each of the magazines 2a and 2b is pushed out of the library apparatus 51 by a distance equal to or slightly greater than the length of each of the end portions 37a and 37b.

The coil springs 52a and 52b are preset to apply a spring pressure that may cause the above-described moving force to be applied to the magazines 2a and 2b. As a result, a space is formed between the rear surface 21d of each of the magazines 2a and 2b and the connection member 34.

After that, in order to connect the connection member 34 to the magazines 2a and 2b, the controller 12 causes the hand mechanism rotating motor 33q to drive to make the transportation opening 31o of the hand mechanism 31 be directed toward a front side of the library apparatus 51. By doing this, the connection protrusions 38 of the end portions 37a and 37b protrude from the connection member retracting hole 33m.

Accordingly, the front surfaces 38f of the connection protrusions 38 that protrude from the connection member retracting hole 33m may oppose the corresponding openings 23a of the connection holes 23. Because of the movement of the magazines 2a and 2b, the second detection sensors 13c and 13d detect the start of ejection and transmit the detection results to the controller 12. Upon receiving this detection results, the controller 12 causes the robot motor 33p to drive to move the transportation mechanism 30 in a direction parallel to the ejection direction (E-direction) of the magazines 2a and 2b.

As the transportation mechanism 30 is moved, the front surfaces 38f of the connection protrusions 38 enter the corresponding connection holes 23 through the openings 23a. The connection protrusions 38 are engaged with the connection holes 23 in a similar manner as illustrated in FIGS. 7B and 7C. Accordingly, the transportation mechanism 30 is connected to the magazines 2a and 2b using the connection member 34.

FIGS. 18A and 18B are third diagrams of the example of the magazine ejecting operation. As illustrated in FIGS. 18A and 18B, when the transportation mechanism 30 moves in a direction parallel to the ejection direction (E-direction) of the magazines 2a and 2b, the connected magazines 2a and 2b are pressed in the ejection direction (E-direction). When the transportation mechanism 30 reaches the standby position T, the magazines 2a and 2b are respectively ejected through the magazine loading openings 1a and 1b.

After that, in order to release connection of the connection member 34 to the magazines 2a and 2b, the controller 12 causes the hand mechanism rotating motor 33q to drive to make the transportation opening 31o of the hand mechanism 31 be directed toward the rear side of the library apparatus 51. By doing this, the connection protrusions 38 of the end portions 37a and 37b are retracted into the connection member retracting hole 33m. Accordingly, connection of the transportation mechanism 30 to the magazines 2a and 2b is released.

The controller 12 issues an instruction to the operator panel 3. The operator panel 3 blinks a lamp or the like, or displays a message on the panel to prompt the operator to eject the magazines 2a and 2b. Accordingly, ejection of the magazines 2a and 2b may also be automatized.

After the magazines 2a and 2b have been removed, in order to cause the connection protrusions 38 to protrude from the connection member retracting hole 33m, the controller 12 causes the hand mechanism rotating motor 33q to drive to make the transportation opening 31o of the hand mechanism 31 be directed toward a front side of the library apparatus 51. The library apparatus 51 waits for insertion of the magazines 2a and 2b through the magazine loading openings 1a and 1b as similarly illustrated in FIGS. 9A and 9B.

In the library apparatus 51 according to the second embodiment, fourth detection sensors 53a and 53b are provided instead of the first detection sensors 13a and 13b and the third detection sensors 29a and 29b. As is the case with the first detection sensors 13a and 13b, these fourth detection sensors 53a and 53b may detect insertion and removal of the magazines 2a and 2b by the operator.

The fourth detection sensors 53a and 53b are provided near the corresponding magazine loading start positions M of the magazines 2a and 2b in the housing 1e to detect that the magazines 2a and 2b reach the magazine loading start positions M. Upon receiving these detection results, the controller 12 may recognize connection of the transportation mechanism 30 to the magazines 2a and 2b.

Accordingly, the fourth detection sensors 53a and 53b also detect connection of the transportation mechanism 30 to the magazines 2a and 2b. As is the case with the first detection sensors 13a and 13b, the fourth detection sensors 53a and 53b may use optical sensors, magnetic sensors, push switches, or the like.

The fourth detection sensors 53a and 53b may also be used in the library apparatus 1 according to the first embodiment instead of the first detection sensors 13a and 13b and the third detection sensors 29a and 29b. Accordingly, the number of components may be decreased.

In the above-described embodiments, the two magazines 2a and 2b are respectively disposed on the left and right sides of the transportation mechanism 30 in the library apparatus 1 or 51. However, the technology described herein is also applicable to a library apparatus that includes a magazine only on one of the left and right sides of the transportation mechanism 30. In this case, a connection arm of a connection member is formed only on a side of the connection member close to the magazine, and a balancer is provided on the other side of the connection member. This structure allows the connection member to have a function equal to that of the connection member 34.

In the above-described embodiments, the magazines 2a and 2b store the magnetic tape cartridges 5, and the magnetic tape library apparatuses 1 and 51 include the magnetic tape drives 11. However, the technology described herein is also applicable to an optical disk library apparatus that includes an optical disk drive as a cartridge processing unit. In this case, components such as a transportation mechanism and magazines which store an optical disk cartridge containing an optical disk may have a structure similar to that of the above-described embodiments.

In addition to cartridges in which storage media are stored, the technology described herein is also similarly applicable to goods warehouse-like library apparatuses that handle cartridges in which goods are stored, tray cartridges on which goods are place, and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A library apparatus comprising:
   a housing that has a magazine loading opening through which a magazine is inserted, the magazine storing a plurality of cartridges;
   a reader that reads an identifier provided on each cartridge stored in the magazine, the reader reading the identifier while the magazine is being inserted through the magazine loading opening and pulled to a preset loading completion position;
   a transportation mechanism that is movable in a direction in which the cartridges are inserted into the magazine and in a direction in which the cartridges are removed from the magazine, the transportation mechanism including
      a removal mechanism that selectively removes one of the cartridges stored in the magazine having been loaded, and
      a connection member to be connected to the magazine inserted through the magazine loading opening; and
   a controller that controls the transportation mechanism;
   a first sensor that detects that the magazine is inserted through the magazine loading opening; and
   a second sensor that detects that the connection member is connected to the magazine,
      wherein the transportation mechanism transports the removed cartridge to a cartridge processing unit provided in the library apparatus, the removed cartridge having been removed using the removal mechanism,
      wherein the controller controls the transportation mechanism such that the transportation mechanism stands by on the magazine loading opening side when the magazine is not loaded, and controls the transportation mechanism such that the transportation mechanism pulls the magazine to the loading completion position when the first sensor detects that the magazine is inserted through the magazine loading opening and the second sensor detects that the connection member is connected to the magazine.

2. The library apparatus according to claim 1,
   wherein the controller controls, when the magazine is transported, a movement amount or a transportation speed of the transportation mechanism to move the transportation mechanism, the transportation mechanism being connected to the magazine,
   wherein the reader reads at least one of the identifiers when the at least one of identifiers is positioned within a readable range of the reader by the transportation mechanism, the identifiers being identifiers of the cartridges stored in the magazine.

3. The library apparatus according to claim 2,
   wherein the housing has a first magazine loading opening through which a first magazine is inserted and a second magazine loading opening through which a second magazine is inserted,
   wherein the reader is provided between the first magazine and the second magazine respectively loaded on the housing,
   wherein the reader includes a mirror portion that reflects an image of an identifier of a cartridge stored in one of the first magazine and the second magazine, and a detector that detects the image reflected by the mirror portion.

4. The library apparatus according to claim 3, wherein each of the first magazine and the second magazine have a first engaging portion to be engaged with the connection member, wherein the connection member has connection arms and second engaging portions, the connection arms each extending toward a corresponding one of the first magazine and the second magazine, the second engaging portions each extending from a corresponding one of the connection arms, the second engaging portions each to be engaged with the first engaging portion of a corresponding one of the first magazine and the second magazine.

5. The library apparatus according to claim 1, wherein the magazine has a first engaging portion to be engaged with the connection member, wherein the connection member has a connection arm and a second engaging portion, the connection arm extending toward the magazine, the second engaging portion extending from the connection arm, the second engaging portion to be engaged with the first engaging portion.

6. The library apparatus according to claim 5, wherein the second engaging portion of the connection member is a connection protrusion, wherein the first engaging portion is a connection hole with which the connection protrusion is engaged, wherein the connection hole has a wall portion being pressed by the connection protrusion when the transportation mechanism pulls the magazine.

7. The library apparatus according to claim 5, wherein the transportation mechanism has a connection release member that separates the second engaging portion away from the first engaging portion to release connection of the connection member to the magazine.

8. The library apparatus according to claim 7, wherein the connection release member is a step portion disposed on a surface opposing the connection member, the step portion separating the second engaging portion away from the first engaging portion when the connection member moves onto the step portion.

9. The library apparatus according to claim 1, wherein the connection member is disposed in a connection member retracting hole formed in a base of the transportation mechanism such that the connection member is vertically movable relative to the connection member retracting hole.

10. The library apparatus according to claim 1, wherein the transportation mechanism includes a movement mechanism, the movement mechanism rotating the removal mechanism, the movement mechanism linearly moving in a direction in which the magazine is inserted and in a direction in which the magazine is ejected, wherein the connection member is disposed in a connection member retracting hole formed in a base of the movement mechanism such that the connection member is vertically movable relative to the connection member retracting hole.

11. The library apparatus according to claim 10, wherein the magazine has a first engaging portion to be engaged with the connection member, wherein the connection member has a connection arm and a second engaging portion, the connection arm extending toward the magazine, the second engaging portion extending from the connection arm, the second engaging portion to be engaged with the first engaging portion, wherein the removal mechanism has a step portion on a surface opposing the connection member, wherein, when the removal mechanism rotates, the connection member opposes the step portion and moves onto the step portion to separate the second engaging portion away from the first engaging portion, the separation of the second engaging portion away from the first engaging portion releasing connection of the connection member to the magazine using the connection member.

12. The library apparatus according to claim 1, wherein the housing includes a magazine lock disposed at a position opposing a rear surface of the magazine, the magazine being inserted through the magazine loading opening, the magazine lock locking the magazine to the housing.

13. The library apparatus according to claim 12, wherein the magazine has a first locking portion to be engaged with the magazine lock, wherein the magazine lock has a first lock arm and a second lock arm, the first lock arm and the second lock arm being rotatable about a shaft in an interlocked manner, the second lock arm having a second locking portion to be engaged with the first locking portion.

14. The library apparatus according to claim 13, wherein the second locking portion is a lock protrusion, wherein the first locking portion is a lock hole, wherein the lock hole is formed in a rear portion wall of the magazine, wherein the second lock arm extends in a direction in which the magazine is ejected so as to oppose the rear portion wall of the magazine.

15. The library apparatus according to claim 13, wherein, to release engagement of the first locking portion with the second locking portion, the controller controls the transportation mechanism to move to press the first lock arm, the first lock arm being pressed to rotate the second lock arm to a release position.

16. The library apparatus according to claim 12, wherein an elastic member is provided in the housing, the elastic member pressing the magazine in a direction in which the magazine is ejected, the elastic member causing the magazine to move in the direction in which the magazine is ejected when a lock using the magazine lock is released, wherein the controller causes the transportation mechanism to move to be connected to the magazine using the connection member, the controller controlling the magazine to be transported to the outside of the housing.

* * * * *